United States Patent [19]
Moran

[11] 3,978,456
[45] Aug. 31, 1976

[54] BYTE-BY-BYTE TYPE PROCESSOR CIRCUIT

[75] Inventor: John Christian Moran, Broomfield, Colo.

[73] Assignee: Bell Telephone Laboratories, Incorporated, Murray Hill, N.J.

[22] Filed: Dec. 16, 1974

[21] Appl. No.: 533,339

[52] U.S. Cl. .............................................. 340/172.5
[51] Int. Cl.[2] ........................................ G06F 13/00
[58] Field of Search ................. 340/172.5; 235/175, 235/176, 156

[56] References Cited
UNITED STATES PATENTS

| | | | |
|---|---|---|---|
| 3,228,005 | 1/1966 | Delmege, Jr. et al. | 340/172.5 |
| 3,292,158 | 12/1966 | Schneberger | 340/172.5 |
| 3,316,538 | 4/1967 | Piloty et al. | 340/172.5 |
| 3,439,347 | 4/1969 | Goshorn et al. | 340/172.5 |
| 3,737,866 | 6/1973 | Gruner | 340/172.5 |
| 3,739,352 | 6/1973 | Packard | 340/172.5 |
| 3,751,650 | 8/1973 | Koehn | 235/175 |
| 3,931,613 | 1/1976 | Gruner et al. | 340/172.5 |

OTHER PUBLICATIONS
R. Gruner et al., "Standard LSI Chips Breed a Fast New Series of Minicomputers" in *Electronics*, Nov. 9, 1970, pp. 64–69.

*Primary Examiner*—Gareth D. Shaw
*Assistant Examiner*—Melvin B. Chapnick
*Attorney, Agent, or Firm*—D. M. Duft

[57] ABSTRACT

A microprogrammed processor which receives 16-bit words as input data from an I/O system, breaks down each received word into four 4-bit bytes, and performs all logical and arithmetic operations on a byte-by-byte basis. The processed bytes may either be stored for further use or reconstituted into 16-bit words and outputted to the I/O system. The processor includes two source buses for applying information to an arithmetic unit (AMU), a destination bus for receiving the AMU output, as well as circuits such as memories and registers for selectively applying AMU input information to the source buses and for receiving AMU output information from the destination bus. Certain ones of the memories can both apply information to source buses and receive information from the destination bus on the same machine operation. Microprogrammed controlled gating facilities specify the circuits that are to be connected to the buses on each machine operation.

20 Claims, 30 Drawing Figures

| FIG. 2 | FIG. 3 |

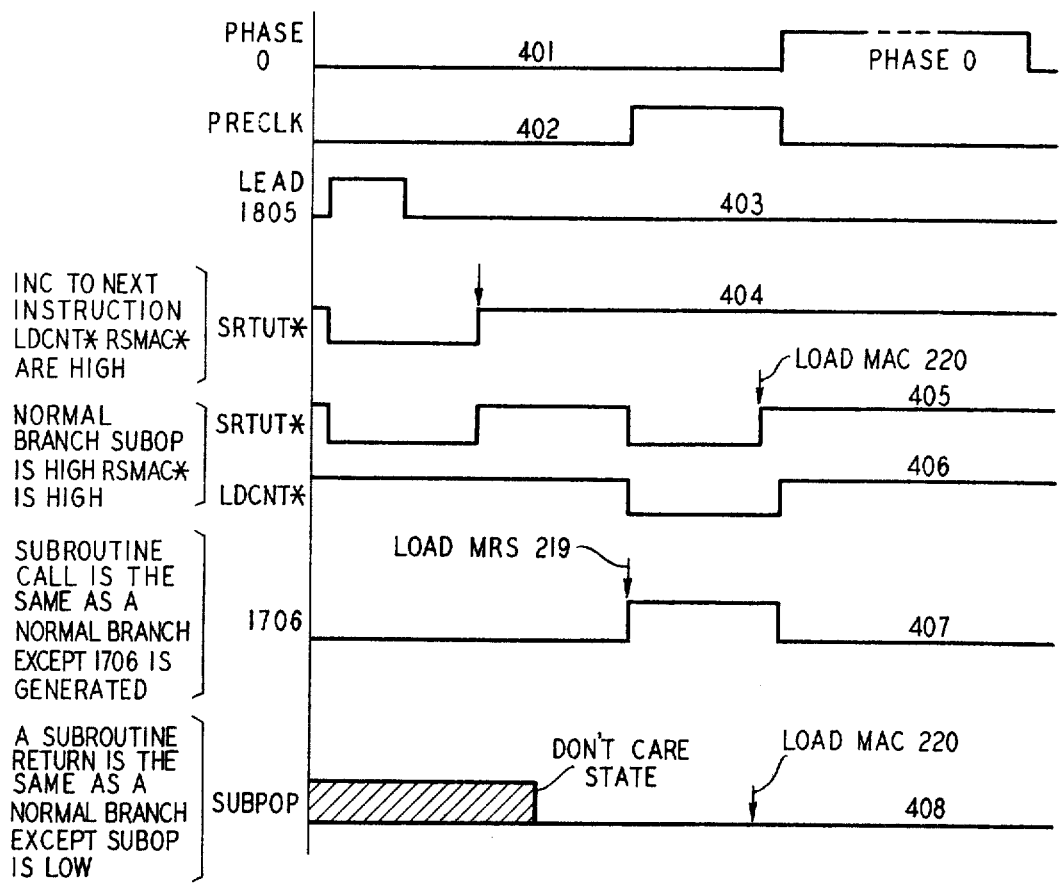
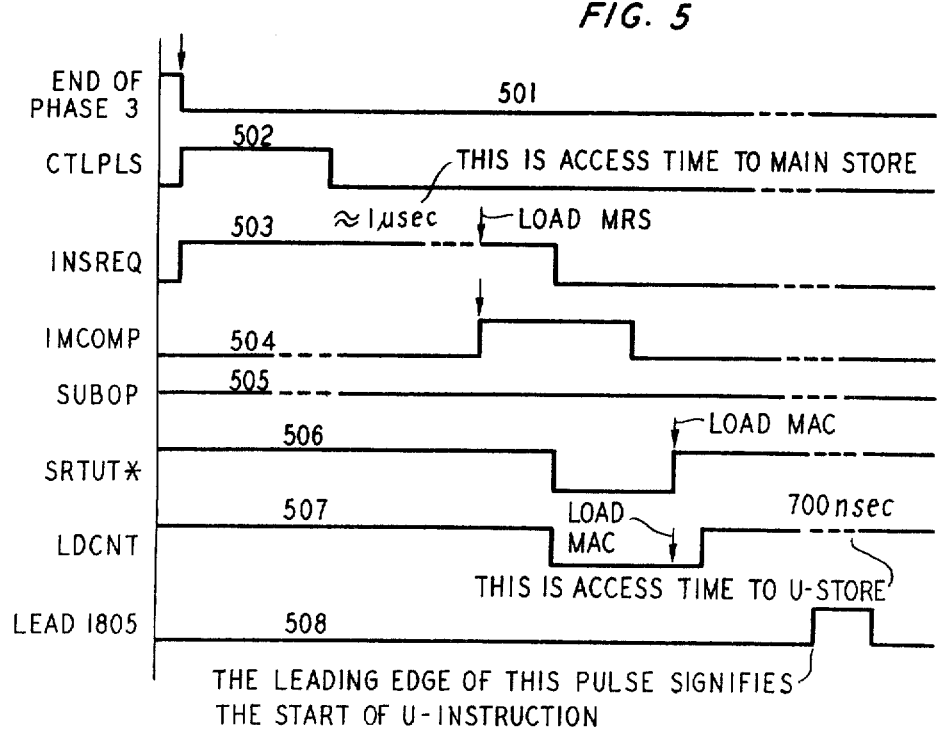

SOURCE BUS 1

SOURCE BUS 2

FIG. 21
ADD R2 TO R1 AND STORE THE RESULT IN R1

| BA | OP CODE 03 | R1 | R2 |
|---|---|---|---|

| 15 | 14 | 13 | 12 | 11 | 10 | 9 | 8 | 7 | 6 | 5 | 4 | 3 | 2 | 1 | 0 |

1. ADD THE CONTENTS OF R2 TO THE CONTENTS OF R1 AND PLACE THE RESULTS IN R1.

FIG. 22
ADD 16 BITS OF IMMEDIATE DATA, I TO R1

| BA | OP CODE 07 | R1 | 0 |
|---|---|---|---|
| I ||||

| 15 | 14 | 13 | 12 | 11 | 10 | 9 | 8 | 7 | 6 | 5 | 4 | 3 | 2 | 1 | 0 |

1. ADD I TO THE CONTENTS OF R1 AND STORE THE RESULTS IN R1.

FIG. 23
ROTATE R1 RIGHT BY N BIT POSITIONS

| BA | CP CODE 11 | R1 | N |
|---|---|---|---|

| 15 | 14 | 13 | 12 | 11 | 10 | 9 | 8 | 7 | 6 | 5 | 4 | 3 | 2 | 1 | 0 |

1. ROTATE R1 RIGHT BY N BIT POSITIONS.

FIG. 24
ROTATE R1 RIGHT AN AMOUNT DETERMINED BY THE LOW 4 BITS OF R2

| BA | OP CODE 13 | R1 | R2 |
|---|---|---|---|

| 15 | 14 | 13 | 12 | 11 | 10 | 9 | 8 | 7 | 6 | 5 | 4 | 3 | 2 | 1 | 0 |

1. THE AMOUNT OF THE ROTATION, N, IS DETERMINED BY THE LOW BITS OF R2.
2. ROTATE R1 RIGHT BY N BIT POSITIONS.
3. R2 IS UNCHANGED
   APPROXIMATE EXECUTION TIME 1.375 MICROSECONDS.

FIG. 25

ARTH — 01

| OP | CF | ARTH | DES | S2 | S1 | CONTROL FIELD |
|---|---|---|---|---|---|---|

| 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |

FIG. 26

MOV — 10

| OP | CF | EMIT | DES | EMIT | S1-S2 | CONTROL FIELD |
|---|---|---|---|---|---|---|

| ARON ADDRESS | | ALU FUNCTION | | ACTIVE INPUT MULTIPLEXER 1609 | ACTIVE INPUT MULTIPLEXER 1606 | INITIAL STATE OF FF1607 |
|---|---|---|---|---|---|---|
| ARTH* LEAD | ARTH FIELD | ARITHMETIC FUNCTION | LOGIC FUNCTION | | | |
| 0 | 0 | | $\overline{A}$ | B | A | S |
| 0 | 1 | | $\overline{A} \cdot B$ | B | A | S |
| 0 | 2 | | $A \oplus B$ | B | A | S |
| 0 | 3 | | $A + B$ | B | A | S |
| 0 | 4 | | $A \cdot \overline{B}$ | B | A | S |
| 0 | 5 | | $A \cdot B$ | B | A | S |
| 0 | 6 | $A-1$ | | B | B | RS |
| 0 | 7 | $A+B$ | | B | B | RS |
| 0 | 8 | $A-B$ | | B | B | S |
| 0 | 9 | $(A+\overline{B})+1$ | | B | B | S |
| 0 | 10 | $A+B+1$ | | B | B | S |
| 0 | 11 | $A+1$ | | B | B | S |
| 0 | 12 | LEFT SHIFT A BY 1 | | B | B | RS |
| 0 | 13 | | | | | |
| 0 | 14 | | | | | |
| 0 | 15 | | | A | A | S |
| 1 | 16 | | A | B | A | S |
| ⁝ | ⁝ | | ⁝ | ⁝ | ⁝ | ⁝ |
| 1 | 31 | | A | B | A | S |

FIG. 29

| AMU-202 | | |
|---|---|---|
| DL | MS | TG |
| | UD09 | PRECLK |
| | UD20 | ARTH* |
| | | MOV* |
| | | LOAD |
| | | CLOCK |
| | | CTLPLS |

| RM MEMORY-208 | | |
|---|---|---|
| DL | MS | TG |
| RM | UD05-06 | CLOCK |
| | UD12-13 | PHO-1 |
| | | SEL |

| TM MEMORY-206 | | |
|---|---|---|
| DL | MS | TG |
| | UD15 | CLOCK |
| | UD9-11 | |
| | UD12-14 | SEL |

| DATA REGISTER-212 | | |
|---|---|---|
| DL | MS | TG |
| LDATA | | CLOCK |
| WR DATA* | | |
| RDFF | | |

| SC & TPA REGISTERS-217 | | | |
|---|---|---|---|
| DL | MS | TG | AMU |
| LDCNT* | | CPHSO* | ADVPA |
| CLRPA* | | CLOCK | |
| | | PRECLK | |

| L REGISTER-216 | | |
|---|---|---|
| DL | MS | TG |
| WRLI | EMIT | |
| LDLI | | |

| SOURCE BUS 1-203 | | | |
|---|---|---|---|
| DL | MS | TG | AMU |
| | UD5-8 | PHI | |

| SOURCE BUS 2-204 | | | |
|---|---|---|---|
| DL | MS | TG | AMU |
| | UD5-7 | MOV* | |
| | UD9-11 | PHASEO* | |

| MICRO STORE-222 FIG. 18 | | |
|---|---|---|
| DL | MS | TG |
| | | UCYYP |
| | | SRTUT* |

| MICRO ADDRESS COUNTER-220 FIG. 17 | | |
|---|---|---|
| DL | MS | TG |
| | UAO-11 | TRST |
| | UD18-19 | IMCOMP |
| | UDO-11 | RSMAC* |
| | | LDCNT* |
| | | SRTUT* |
| | | SUBOP |
| | | INSREQ |

| SAR REGISTER-215 | | |
|---|---|---|
| DL | MS | TG |
| EWSAR | | CLOCK |

| R1 & R2 REGISTER-209 | | |
|---|---|---|
| DL | MS | TG |
| LDOP | | PHO |

| CM MEMORY-207 | | |
|---|---|---|
| DL | MS | TG |
| | | PHO-1 | ns than do the currently available machines.

BYTE-BY-BYTE TYPE PROCESSOR CIRCUIT

BACKGROUND OF THE INVENTION

1. Field of the Invention

This invention relates to a processor and more particularly to a processor which subdivides each word it receives into a plurality of multibit bytes and then performs logical and arithmetical operation on each word on a byte-by-byte basis.

2. Description of the Prior Art

The function of a processor in a system environment is to receive information such as instructions, commands, and data from the system, process the received information, and then transmit the processed results back to the system in the form of new, altered, or changed information words. The typical processor internally operates upon information words of the same bit size as those received from and transmitted to the system. Thus, if words in a 16-bit parallel format are received from the system of which the processor is a part, the processor internally manipulates and performs logical and arithmetic operations on the words in the same 16-bit format.

This mode of operating a processor is satisfactory and even desirable in systems in which high speed operation (high processor throughput) is required and in which the lowest possible processor cost is not of paramount importance. Such is the case in large systems wherein the cost of the processor is only a small portion of the overall system cost. There are many systems however, such as small line size PBXs, in which the design of the processor significantly determines the overall system cost and wherein satisfactory results may be obtained from a processor having only a moderate or even a relatively low throughput. In other words, there are many systems that can provide satisfactory service with a low speed processor.

Considerable economics can currently be achieved in processor design by using relatively inexpensive and readily available 4-bit slice medium scale integrated circuits. With these chips, it is known to construct a processor that receives data words and information from an I/O system in a 16-bit parallel format, breaks down every received word into a plurality of multibit bytes, performs logical and arithmetical operations by manipulating the bytes one at a time, and then reconstitutes the manipulated bytes into 16-bit words which are transmitted back to the I/O system.

The Data General Corporation of Southboro, Massachusetts manufactures computers which operate in a 4-bit byte-by-byte manner. However, these computers are designed primarily for commercial minicomputer applications, and they are somewhat limited in their internal structure as well as in the type of operations they can perform with a given amount of memory. Although they are adequate for the mass application commercial market, they are not ideally suitable for use in applications, such as PBX system controllers, where a maximum level of operational sophistication must be achieved with a minimum of memory. It might possible for the currently available byte-by-byte machines to perform more sophisticated operations. However, this could only be done with an increased amount of bulk memory which, in turn, would increase the cost of the machines and render them economically unsuitable for certain applications.

It is therefore a problem to provide a processor that requires less memory to perform sophisticated operations than do the currently available machines.

SUMMARY OF THE INVENTION

Object

An object of the invention is to provide an improved processor.

A further object is to provide an improved processor which performs its operations in a byte-by-byte manner.

A further object is to provide a byte-by-byte data processor having improved operational with respect to its internal elements.

SUMMARY DESCRIPTION

In accordance with the present invention, an improved byte-by-byte processor is disclosed having an arithmetical unit (AMU), a pair of source buses for receiving information that is to be operated upon by the AMU, a destination bus for receiving output information from the AMU, a plurality of circuits such as registers and memory elements for applying information to the source buses, and a plurality of circuits such as registers and memory elements for receiving from the destination bus the output of the AMU in byte-by-byte sequence. Many of these circuits can apply output information to the source buses as well as receive information from the destination bus.

The disclosed processor is of the microprogrammed type. A microprogram controls gating facilities which on each operation specify the circuit element or elements that are to apply information to the source buses as well as the circuit element that is to receive the AMU output from the destination bus. This bus structure, the connection of certain of the circuits to both the source and the destination buses, together with the microprogrammed controlled gating facilities provide a processor having improved flexibility for enabling any circuit connected to the source buses to supply information to the AMU on any operation and for permitting any circuit connected to the destination bus to receive the output of the AMU on any operation. Also, for those circuits which are connected both to the source buses and to the destination bus, the same circuit can apply information to a source bus and receive information from the destination bus on a single operation. This arrangement provides heretofore unavailable flexibility.

Further in accordance with the present invention, one of the circuits connected to the source buses, is a read-only memory which is used to store words representing various constants that are frequently used in the operations the processor performs. Examples of such words are a word containing all zeros, a word containing all ones, et cetera. The output of this read-only memory is connected to one of the source buses and, under control of gating and addressing facilities, any word in the memory can be applied via the source bus to the AMU. The storage of constants in a read-only memory and their easy availability to the AMU, is superior over other ways of providing the same information, such as storing it in the microprogram. If the 16-bit constants were stored in a microprogrammed memory, it would require that each microprogram word be 16-bits wider and it would further require the availability of a 4-1 multiplexor for extracting these 16-bit words from the microstore and applying them to the AMU byte by byte.

Further in accordance with the present invention, a data register is provided having four different functions. First, the data register can register words received in 16-bit parallel format from the system data bus. Second, the register can apply each registered word byte by byte in sequence to the source buses for transmission to the AMU. Third, the register is connected to the destination bus and, under control of the processor gating facilities, a word applied by the AMU to the destination bus may be entered into the register byte by byte. Fourth, the data register can subsequently apply this word to the system data bus in a 16-bit parallel format. The provision of a data register having this capability provides an efficient means of permitting both the processor source and destination buses to exchange information with the system data bus. The data register thus provides an interface between the parallel 16-bit word format of the data bus and the 4-bit byte-by-byte format of the processor buses.

Further in accordance with the present invention, improved and flexible addressing facilities are provided for one of the memories (termed the RM memory) that applies its output to the source buses. All of the circuits (registers and memories) connected to the source buses are addressable with information supplied by the AMU. This requires the AMU to derive the addressing information under the joint control of the microprogram and/or the high-level instructions received from the system of which the processor is a part. It is sometimes desirable to use certain fields of the high-level instructions, which are received by the processor from the system data bus, directly as addressing information. In such cases it is obviously desirable that the bits representing this information do not have to be applied to the source buses and extended through the AMU to the RM memory. Accordingly, the RM memory has facilities for receiving addressing information from the AMU as well as from a special register termed the R1 R2 register. These facilities comprise hard wiring between the R1 R2 register and the RM memory. The R1 R2 register receives from the system data bus the eight low-order bits of high-level instruction words. There, bits comprise address information which, by means of the hard wiring, may be applied directly to the RM memory. By this means, as soon as these low-order eight bits are received from the data bus and entered into the register, either 4-bit byte of this information may immediately be applied to the RM memory as address information to select any word in the memory and cause it to be applied to the source bus. This mode of addressing the memory increases the work that can be done by the processor by eliminating the machine instructions that would otherwise be required to transmit the same address information from the R1 R2 register via the AMU to the RM memory.

Further in accordance with the invention, the eight bits in the R1 R2 register may be applied to either source bus as two 4-bit bytes rather than to the RM memory. The two bytes in the register are applied to the source bus during the first two phases of a 4-byte readout operation. Masking facilities prevent the receipt of undesired information from the register during the last two phases in which the third and fourth bytes of a 4-byte 16-bit word would normally be applied to the source bus.

Further in accordance with the present invention, the present processor provides improved facilities for comparing two words against each other for the existence of an all zeros conditions. In many processing operations it is desired to perform logical operations such as AND functions to determine the similarity or the dissimilarity between the corresponding bit orders of two words. If the two words are dissimilar in each of their corresponding bit orders, the result of the AND function is a word comprising all zeros. In order to determine this all zeros condition, it is typically necessary to compare the result of the AND function with a word that is known to contain all ones.

In accordance with the present invention, this second operation is eliminated by providing facilities in the AMU which instantaneously detect the existence or nonexistence of an all zero result from the logic operation on each byte. Specifically, a flip-flop in the AMU is set if the result of an AND function for the first byte of two words is all zeros. The flip-flop remains set as the subsequent bytes of the two words are ANDed and an all zero result is detected. The set state of the flip-flop at the end of the AND operation for all four bytes indicates that the result of the AND operation is a word containing all zeros. Contrariwise, two words could be ANDed and the flip-flop set to indicate an all zeros result on the first byte. However, if a nonzero condition is detected in a subsequent byte, the flip-flop is reset and the provided circuitry prevents the flip-flop from again being set even though all zeros may be detected on subsequent bytes. The reset state of the flip-flop at the end of the AND operation for all four bytes indicates that an all zero condition of all four bytes was not detected. This facility eliminates the additional machine operations typically required in other processors wherein the results of the AND operation itself must be compared with a known word to determine an all zeros state.

Further in accordance with the present invention, the provision of two source buses permits two different source circuits to apply information simultaneously to the AMU so that arithmetic or logical operations may be performed expeditiously upon the simultaneously received information. This facility is advantageous over prior art arrangements wherein one source bus is provided. In such arrangements, a logical or arithmetic operation is performed upon two words by applying them in sequence to the AMU.

Features

Accordingly, a feature of the invention is the provision of a processor having an arithmetic unit, a destination bus for receiving the output information from the AMU, and a plurality of source buses for simultaneously applying information over both source buses to the AMU.

A further feature is the provision of source circuits connected to each source bus for applying information thereto, destination circuits connected to the destination bus for receiving information therefrom with certain of the circuits being connected to both the source and destination buses.

A further feature is the provision of facilities for applying information to a source bus from any of the source circuits selectively, and for extending the information on the destination bus selectively into any destination circuit.

A further feature is the provision of facilities for storing constants in a read-only memory and for selectively applying any constant to the source bus.

A further feature is the provision in one of the source circuits of addressing facilities which include facilities for addressing the source circuits from output information provided by the AMU as well as facilities for addressing the memory directly by hard wiring from another one of the source circuits.

A further feature is the provision of facilities in the AMU for detecting any condition in which the output of an AND operation is all zeros.

A further feature is the provision of a register for registering the entirety of a multibit word as received from a system data bus external to the processor, for applying the registered word byte by byte to one of the source buses, for receiving a word in a byte-by-byte sequence from the destination bus, and for applying all bits of the word received from the destination bus simultaneously for the data bus.

A further feature is the provision of facilities wherein separate source circuits may apply separate data words to separate ones of the source buses for simultaneous reception by the AMU which, in turn, performs the required arithmetic and/or logical operation on the simultaneously received words.

A further feature is the provision of facilities for receiving less than all of the bytes of a multibyte word from a register and for masking the output of the register from the source bus during subsequent phases of the machine readout operation.

DESCRIPTION OF THE DRAWING

These and other objects, advantages, and features of the invention may be more readily understood upon a reading of the following description of an exemplary embodiment of the invention taken in conjunction with the drawing in which FIG. 1 discloses a telephone system embodying the invention:

FIGS. 2 and 3 disclose the data processor of FIG. 1;

FIGS. 4 and 5 are timing diagrams which illustrate the time interrelationship between the various control pulses applied to the microstore elements 219, 220, 221, and 222 of the processor;

FIGS. 21 through 24 disclose typical high-level program instructions that may be executed by the processor;

FIGS. 25 and 26 disclose typical microstore instructions;

FIG. 27 discloses the truth cable for the processor AROM element 1602 of FIG. 16;

FIG. 29 discloses in tabular form the source circuits for the various control conductors and control signals used by the processor.

FIG. 30 illustrates how FIGS. 2 and 3 should be arranged with respect to each other.

GENERAL DESCRIPTION

Figure 1:
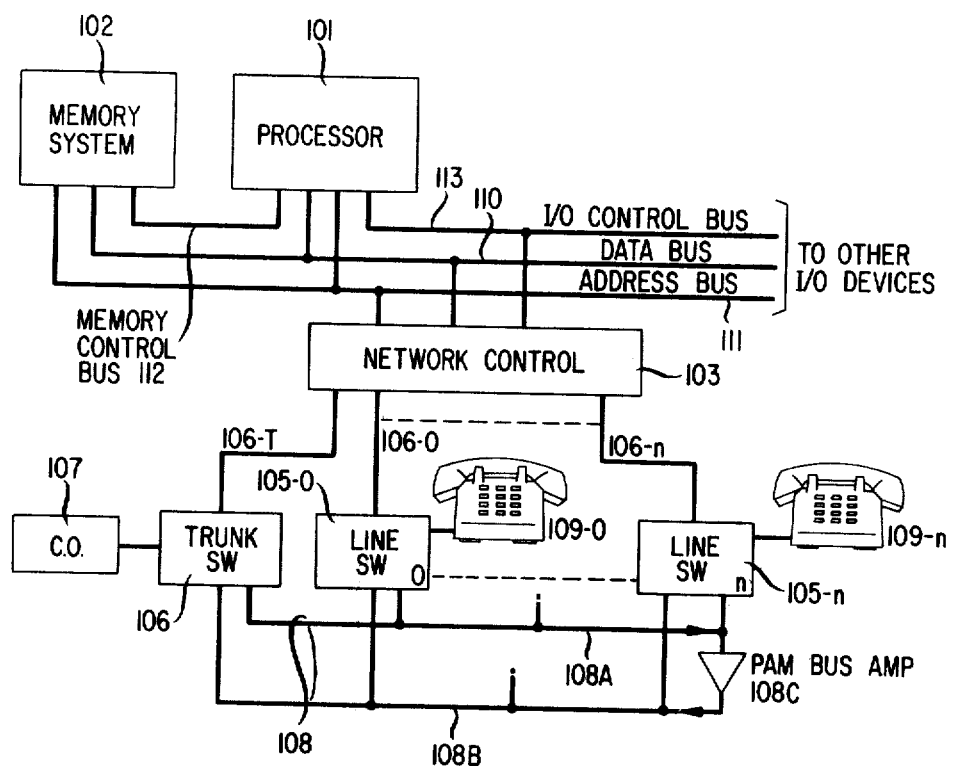

A telephone system and a processor embodying the present invention is shown diagrammatically on FIG. 1. This system comprises a processor 101, memory 102, line switches 105, and a trunk switch 106. The line switches are connected to telephone subsets 109; the trunk circuit is connected to a central office 107. The line switches and the trunk circuit are also connected over individual ones of conductor paths 106 to a network control 103. The system further includes a data bus 110, an address bus 111, a memory control bus 112, and an I/O control bus 113. The address bus and the data bus are connected in common to the memory system, the processor, and the network control; the memory control bus 112 connects only the processor and the memory; the I/O control bus connects only the processor and the I/O system of which network control 103 is a part.

The processor 101 operates under control of the program commands and data that is either temporarily or permanently stored in the memory system 102. The processor, with the assistance of the memory system, controls the time division switching network 108 shown in the lower portion of FIG. 1. It does this by monitoring the state of each line and trunk switch and by selectively altering the state of various hardware elements in both the network controller and the line switches and trunk switches. Commands are transmitted to the network control from the processor over data bus 110. Scan responses and other state information are transmitted back to the processor from network control over data bus 110. The network control is selected by the address bus 111.

In a typical time division manner, two line switches, or a line switch and a time switch, are interconnected on a call by determining the availability of an idle time slot, by assigning the two circuits that are to be connected to the idle time slot, and by then closing the time division switches of the two circuits during each occurrence of the time slot. A line switch such as, for example, line switch 105-0, is assigned to a time slot by writing a binary 1 into a line switch shift register location unique to the time slot. This causes the switch to close during each occurrence of the time slot so that the line switch is connected to the time division bus 108 during each occurrence of the time slot to which it is assigned. In a similar manner, a line switch or a trunk switch is removed from a call by erasing the binary 1 bit in its shift register. This deactivates the line switch so that it thereafter does not close during subsequent occurrences of the time slot to which it was assigned.

The processor can selectively address memory locations by transmitting address information over the bus 111 to the memory. The contents of the addressed memory location are returned to the processor over data bus 110. The processor communicates with network control in a similar manner with address commands being transmitted over bus 111 and with the system responses being returned over bus 110. The control buses 112 and 113 comprise a plurality of separate wires with each wire being used for a distinct function such as, for example, memory write, memory read, and memory complete indications. The various conductors of bus 113 perform similar functions. Buses 110, 111, and 113 also extend to other I/O devices such as, for example, data links and the like.

Figure 2:
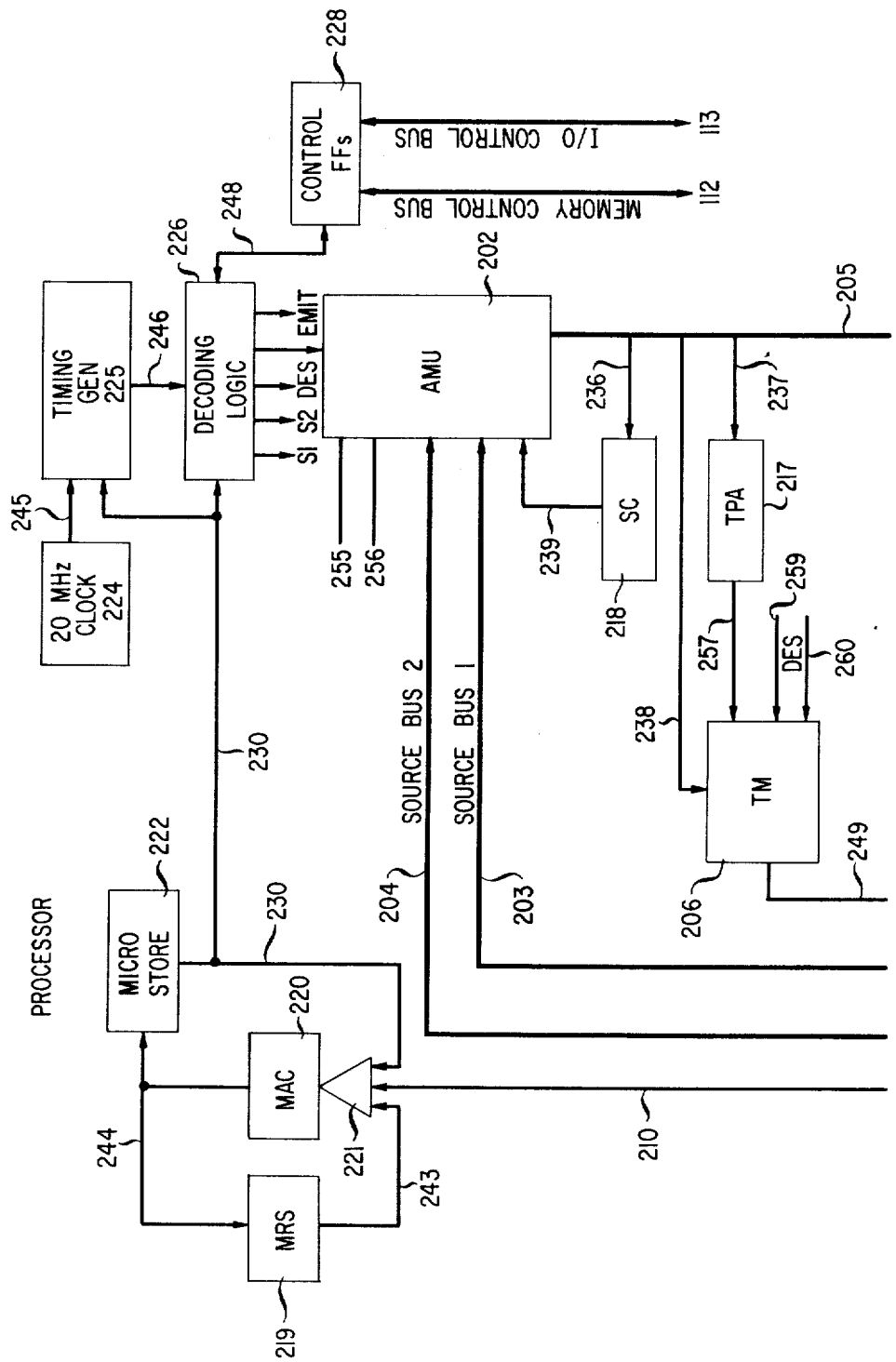

FIGS. 2 and 3 disclose a processor embodying the present invention. This processor is of the microprogrammed type. It includes an arithmetic unit AMU 202, a source bus 1 (element 203), and a source bus 2 (element 204). The source buses apply to the AMU the information that is to be manipulated by arithmetical or logical operations. The processor also includes a destination bus 205 which receives the output information of the AMU.

The processor further includes a random access TM memory 206, a read-only CM memory 207, and a random access RM memory 208. The output of the TM memory is applied over path 249 to source bus 2 via the bus multiplexor 204-M; the outputs of the CM and RM memories are applied over paths 250 and 251 to source bus 1 via bus multiplexor 203-M. The destination bus 205 can apply the information it receives from the AMU selectively to the TM memory 206, the SC register 218, the TPA register 217, the L register 216, the RM memory 208, the data register 212, as well as to the SAR register 215. Register SC stores the two low-order bits of the shift and rotate information. Registers TPA and L store address information for memories TM, CM, and RM.

The processor also includes path 210 which applies data to and receives data from the data bus 110, shown on the lower portion of FIG. 3. All data applied by the processor to data bus 110 is first entered into the data register 212 and is then applied over path 210 to bus 110. The information the processor receives from bus 110 may alternatively be entered into data register 212, the R1 and R2 registers 209, or into MAC register 220 via multiplexor 221. The processor applies address information to the system address bus 111 (FIG. 3) by means of the SAR register 215 and path 229. The SAR register receives this address information from the AMU via the destination bus 205.

The processor is of the microprogrammed type and, accordingly, it includes a read-only microstore memory 222 which is addressed by information from the MAC register 220. The output of the microstore 222 extends over path 230 to the decoding logic 226 and to the timing generator 225. Element 226 comprises a plurality of decoders which receive and decode the output of the microstore 222 to generate the gating, strobe, and other signals required for control of the processor. The timing generator 225 also contains the circuitry required to generate many of the control required for operation of the processor. These signals are shown on the timing diagrams of FIGS. 31, 34, and 35. The input to the generator 225 from path 230 selectively alters and controls the state of the generator to accommodate the various processor functions. The timing generator is also controlled by clock 224. The MAC register 220 may be loaded from the MRS register 219, by the microstore 222, or by bus 210. The information received from the microstore 222 advances the MAC register to a new address from a microstore 222 branch instruction; the information received on bus or path 210 can set the MAC register to any address position; the MRS register is used to store subroutine return address information and at the end of the subroutine it resets the microstore to the proper return address. The clock 224, the timing generator 225, and the decoding logic 226 together interpret and decode the microprogram words received from the microstore 222, and they generate all necessary timing and control signals required to execute these instructions.

The control FF's 228 comprise a plurality of flip-flops which are settable by signals received from the decoding logic 226 as well as from buses 112 and 113. When settable by the decoding logic, these flip-flops apply control signals such as, for example, read or write commands to buses 112 and 113. When settable in response to information received from buses 112 and 113, these flip-flops store information and make it available to the processor indicating that a memory command or an I/O function has been completed.

It is assumed by way of example and for purposes of this description that data bus 110 and the address bus 111 are 16-bit parallel buses. Accordingly, the processor exchanges data and information with the memory and I/O systems over buses 110 and 111 by means of 16-bit words. The processor operates internally upon the 16-bit words it receives from bus 110 by subdividing them into four 4-bit bytes and by then moving, manipulating, and performing logical and arithmetic operations upon each word in a byte-by-byte manner. With the exception of the information required by the microprogrammed section of the processor and the decoding logic, all information is moved within the processor via source bus 1, source bus 2, the AMU, and the destination bus 205 on a 4-bit byte-by-byte basis.

The data register 212 transmits to and receives information from data bus 110. All information sent over bus 110 to the memory system 102 or transmitted to an I/O device, such as network control 103, must be generated by internal elements of the processor, applied to the destination bus 205, and entered byte by byte into data register 212. From there the information is applied as 16-bit words to bus 110. Similarly, all information the data register 212 receives from the memory system or the I/O system on bus 110 is received and entered in a 16-bit word format. Each such received word is subsequently applied from register 212 to the various internal elements of the processor on a 4-bit byte-by-byte basis.

The internal data buses are source bus 1, source bus 2, and destination bus 205. A 16-bit word representing either data or program information may be applied byte by byte to one of the source buses, transmitted to the AMU, and then applied to the destination bus byte by byte. From the destination bus, each byte can then be (1) entered into a register or memory of the processor, (2) applied to register 215 where it is converted to a 16-bit format and then applied as address information to the address bus 111, or (3) entered into the data register 212 where it is converted into 16-bit format and applied as data over path 210 to bus 110.

In order to further describe the processor, let it be assumed that a 16-bit word is received from bus 110 and applied or path 210 to the data register 212 where it is temporarily stored in a 16-bit format. Subsequently, when the word is to be processed or operated upon by the AMU, it is moved from register 212 and applied over path 231 to source bus 1 or to source bus 2 and, in turn, to the AMU 202 in a byte-by-byte sequence. The four least significant bits (byte O) are first placed on the source bus, processed by the AMU, and applied to destination bus 205. From there this byte can be entered into any circuit connected to bus 205 such as, for example, the SAR register. This operation may then be performed three more times to transmit the entirety of the 16-bit word from the data register 212 and to enter it in its altered form in the SAR register.

The time required for the processor to operate upon a 16-bit word in a byte-by-byte manner is termed a microcycle. A microcycle is subdivided into four phases designated 0, 1, 2, and 3. There is one phase for each of the four bytes which make up a 16-bit word; each phase is broken up into two subphases termed load and clock. The AMU contains a separate 4-bit register for each of the two source buses. During the load subphase, a selected source circuit, such as the TM, CM, or RM memory, register 209, or data register 212, places its information on a source bus. At the end of the load subphase, this information is strobed into the appropriate 4-bit register of the AMU. At the end of the clock subphase for this phase, the results of the operation performed by the AMU on this data in its 4-bit registers are strobed into a destination circuit such as the SAR register 215, data register 212, RM memory 208, or TM memory 206.

The RM memory is a small bipolar memory (64 × 4) and it is used to provide a system programmer with 16 general purpose registers. The R1 and R2 inputs of this memory are hard-wired to the outputs of the R1 R2 register 209 and they provide a means of rapidly addressing the memory with the information received from bus 110 and entered into the R1 R2 register. The address input 256 of the RM memory provides only the beginning address of a 16-bit word which is stored in a 4-bit byte fashion. The individual bytes of this word are addressed under control of the phase information which is received from the timing generator.

The CM memory is a bipolar read-only memory (ROM) having a capacity of 256 × 4 bits. This memory provides constants for use by the microprogram. One frequently used constant, for example, is a 16-bit word, stored in byte-by-byte fashion, which contains all zeros. The L register is used for addressing purposes and is a 6-bit register which can be loaded either from the destination bus over path 240 or from a microinstruction over path 258. The L register is used by the microprogram for indexing operations.

The TM memory is a bipolar RAM which has a capacity of 24 × 4 bits. This provides an equivalent capacity of six 16-bit registers.

DETAILED DESCRIPTION

The processor of FIGS. 2 and 3 is of the general purpose type and the operations it can perform are many and varied in number. As a general summary of its capabilities, the processor can cause information to be applied to either one or both of the source buses from any selected one of the circuits whose outputs are connected to these buses. This information is received from the buses by the AMU, operated upon in the manner specified by the microstore 222 instruction, and applied to the destination bus. From there, this information can be applied to any circuit whose input is connected to the destination bus.

The capability of the processor may be better appreciated from a description of a few of the more typical operations it can perform. FIG. 21 illustrates a machine instruction which adds the contents of a word R2 of the RM memory 208 to the contents of the word R1 and stores the result in word R1. Words R1 and R2 are not the first and second word of the RM memory; they are the words whose address is specified by the contents of the R1 and R2 fields of the instruction. The R2 field comprises bits 0 through 3; the R1 field comprises bits 4 through 7. The OP code for this instruction is 03 and is stored in bits 8 through 14 of the field. The function of the BA field bit is not material to an understanding of the present description.

The instruction of FIG. 21 is received by the processor from the memory system 102 via the data bus 110 and path 210. The rightmost eight bits of this instruction, namely the R1 and R2 fields, are entered into the R1 and R2 registers 209; the OP code bits are applied over path 210 to the middle input of the multiplexor 221 and, in turn, to the MAC register 220 where a binary 03 is entered into the register. This binary 03 specifies the beginning address of the microstore 222 instructions required to control the decoding logic 226 and timing generator 225 so that the operations specified in FIG. 21 are performed. The first word of this microinstruction is of the type shown in FIG. 26 and is termed a move (MOV) instruction. For this instruction, the RM memory is the source circuit and the TM memory is the destination circuit. At this time, under control of the FIG. 26 instruction, the word R2 in the RM memory is applied to source bus 1, applied through the AMU, and entered into the address location of the TM memory specified by the DES field of FIG. 26.

Next, the system increments the MAC register one position and advances it to an arithmetic instruction of the type indicated in FIG. 25. In this instruction, the TM memory applies word R2 to source bus 2, the RM memory applies word R1 to source bus 1, the AMU adds the two words, and enters the resultant sum into word R1 of the RM memory. For this operation the RM memory is the source circuit specified by the S1 field, the TM memory is the source circuit specified by the S2 field, and the RM memory is the circuit specified by the destination (DES) field. The contents of the arithmetic field cause the AMU to add the information applied to the two source buses.

In performing this operation, the word R2 in the TM memory is applied byte by byte to source bus 2, the word R1 from the RM memory is applied byte to byte to source bus 1. The AMU adds and determines the sum of each pair of bytes as it receives them from the two source buses and places the resultant sum on the destination bus. From there, each byte from the AMU is entered into the R1 word of the RM memory since the RM memory is the destination circuit identified in the DES field in the arithmetic construction of FIG. 25.

Another type of instruction the machine can perform is of the type indicated in FIG. 22 in which a specified binary word 1 is added to the contents of word R1 of the RM memory with the results being entered into word R1. This operation requires two instruction words as indicated in FIG. 22. In the first word, the contents of the R1 field are received from the data bus 110 and entered into the R1 register 209. This information is then applied over path 253 as addressing information to the RM memory to specify the word that is to be operated upon. Also in the first word, the OP code of 07 identifies the instruction and it is entered via the multiplexor 221 into the MAC register 220 to advance the microstore to the proper address. This address information advances the microstore 222 to a move type instruction of the type indicated in FIG. 26 in which the R1 word of the RM memory is applied to the source bus 1, transmitted to the AMU, passed through the AMU, and entered into an appropriate word of the TM memory.

Next, the second word of the FIG. 22 instruction is received by the processor. The entirety of this word represents the binary number that is to be added to the current contents of R1 and then stored in R1. This 16-bit word is received via bus 110 and is entered into the data register 212. Next, the microstore advances to an arithmetic type instruction as indicated in FIG. 25. At this time, the 16-bit word in the data register 212 is read out and applied to source bus 1 byte by byte in each machine phase while, at the same time, the word R1 in the TM memory is read out and applied byte by byte to the source 2 bus. These two words are concurrently received by the AMU byte by byte, added, and the resultant sum placed on the destination bus 205 and entered into word R1 of the RM memory.

As already mentioned, the CM memory 207 is of the ROM type; it stores only constants. It can be used in operations similar to those just described. For example, an instruction could require that a specified word of the CM memory be added to a specified word of the RM memory and the resultant sum be stored in the same or any other word of the RM memory or, alternatively, applied out to either the data bus 110 or the address bus 111. An instruction of this type would be performed by machine operations analogous to that just described.

DESCRIPTION OF FIG. 23

FIG. 23 illustrates a high-level machine instruction that is used in connection with the processor shift and rotate facilities. An 11 in the OP code field identifies the instruction and indicates that a word R1, whose address in the RM memory is specified by the R1 field, is to be shifted by the number of bit positions specified by the N field. This instruction is received over data bus 110, extended to the processor over path 210, with the OP code bits being entered by multiplexor 221 in the MAC register 220. The rightmost eight bits, the R1 and N fields, are entered into the R1 and R2 registers 209.

This instruction requires two microstore-level instructions to execute. The first microinstruction applies the contents of the R2 register out over path 234 to a source bus 2. From there, this information is passed through the AMU and applied over path 236 to the SC and TPA registers 218 and 217. The contents of these registers at this time together now represent the specified number of bit positions the R1 word is to be shifted. In the next microinstruction the contents of the R1 register 209 address the RM memory 208 and so that it applies the contents of the R1 word to the source bus 1 over which it is extended to the AMU. The AMU writes this information byte by byte in a specially ordered sequence in the TM memory. This specially ordered sequence is defined by the shift information stored in the TPA register 217. The original R1 word still remains in the RM memory. Next, the original R1 word is read out of the R1 portion of the RM memory onto the source 1 bus. Concurrently, the reordered version of the word is read out byte by byte from the TM memory onto the source 2 bus. Both of these buses at this time effectively are connected to a shift circuit in the AMU and, as each byte is read out from the two memories concurrently, the information represented by each pair of concurrent bytes is received by the shift circuit and rewritten in the TM memory in the shifted form specified by the current contents of the SC register. From the TM memory, the word is then read out as required via source bus 2, the AMU, and the destination bus and applied to any of the circuits connected to the destination bus.

DESCRIPTION OF FIG. 24

FIG. 24 discloses a slightly different type of shift instruction. For this instruction, the contents of the R1 word are right shifted by an amount specified by the low four bits of the R2 word in the RM memory. The processor receives this instruction on the data bus 110, enters the OP code of 13 into the MAC register 220 via the multiplexor 221, and enters the R1 and R2 bits into the R1 and R2 register 209. Next, the contents of the R2 register are applied as addressing information to the RM memory which reads out the contents of its R2 word byte by byte and applies it to source bus 1 over which it is extended to the AMU. The first three bytes are disregarded and not used. The last byte, the low order four bits, are extended from the AMU over paths 236 and 237 to the SC and TPA registers where they specify the number of bit positions the R1 word is to be shifted. Next, in a manner similar to that already described for the shift and rotate function of FIG. 23, the contents of the R1 word from the RM memory are applied to the source 1 bus and, via the AMU, are written in an altered sequence in the TM memory. The R2 word in the RM memory and the R2 word in its altered sequence from the TM memory are then concurrently, applied byte by byte to source bus 1 and source bus 2, and written in the TM memory with the amount of bit shifting specified by the SC register.

SAR REGISTER — FIG. 6

Figure 6:
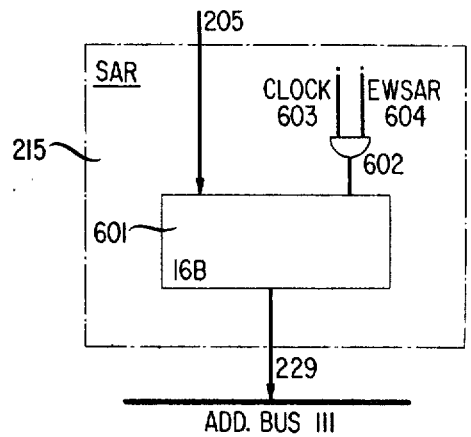
FIG. 6 discloses the details of the SAR 215 register of FIG. 3.

The SAR register 215 on FIG. 3 is illustrated in further detail on FIG. 6. This register is of the 16-bit type and it stores address information that is to be transmitted to the memory system 102 or the I/O system. The SAR register comprises four 4-bit shift registers, such as for example, SN7496-type devices. These are arranged to form a memory of the 4×4 type which is designated as element 601 on FIG. 6. These shift registers operate in such a manner that they receive the information from the destination bus 205 four bits at a time byte by byte. The received infomation is subsequently applied in parallel as a 16-bit word to the address bus 111. AND gate 602 controls the gating of information into register 601 from bus 205. The EWSAR signal on conductor 604 is driven true to indicate that the SAR register is to be a destination for the information applied to bus 205 by the AMU 202. The clock conductor 603 receives the clock signals indicated on FIG. 28 and permits the sequentially applied bytes on the destination bus 205 to be gated into register 601. The EWSAR signal is supplied by the decoding logic element 226 on FIG. 2; the clock signal is supplied by the timing generator 225. This is shown on FIG. 29 for register SAR as well as for all other circuits.

R1 AND R2 REGISTERS — FIG. 7

Figure 7:
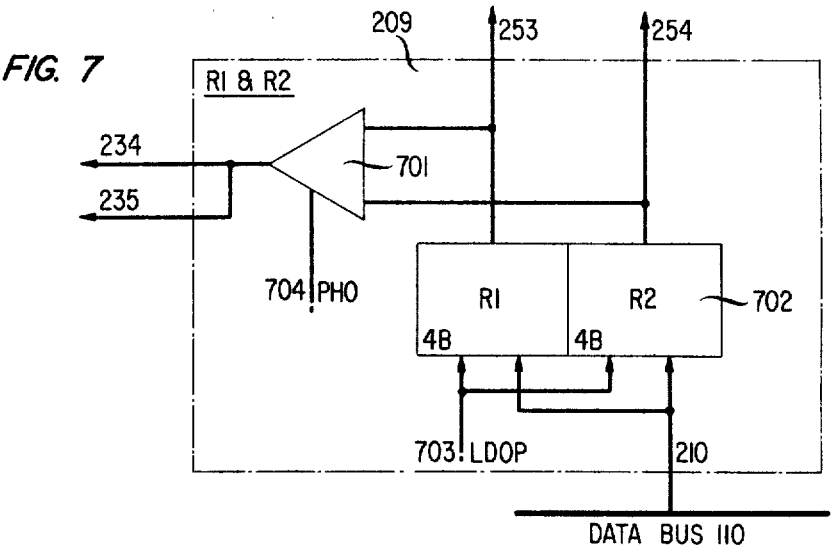
FIG. 7 discloses the details of the R1 and R2 registers 209 of FIG. 3.

The R1 and R2 registers 209 on FIG. 3 are illustrated in further detail on FIG. 7. The R1 and R2 registers together receive and temporarily store the least significant eight bits of instruction words received by the processor from the data bus 110. The leftmost eight bits are received and stored by other elements of the processor including the MAC counter 220 which stores the seven bits of the OP code.

The R1 and R2 registers comprise two 4-bit registers which together are designated element 702 on FIG. 7. The eight bits of information applied by the data bus 110 over path 210 to registers R1 and R2 are gated into these registers under control of an LDOP signal on conductor 703. This signal is received from the timing generator 225 on FIG. 2 and it is generated after the memory system 102 responds with a memory complete signal on a dedicated conductor of the memory control bus 112.

The outputs of the R1 and R2 registers are also connected over paths 253 and 254 to the address control circuitry of the RM memory 208. These connections permit the contents of the R1 and R2 registers to be transmitted directly to the RM memory for addressing purposes.

The multiplexor 701 is used to convert the eight bits in the R1 and R2 registers into two 4-bit bytes. This conversion is done under control of the PHO sigal of FIG. 28 which is the least significant bit of the encoded phase information generated by the timing generator. This information is received over conductor 704. When the PHO signal is high, the contents of the R1 register are extended through the multiplexor to the source buses; when the PHO signal is low, the contents of the R2 register are applied by the multiplexor to the source buses. Element 701 may be an SN74157-device. Registers 702 may be two SN7495-devices.

L REGISTER — FIG. 8

Figure 8:
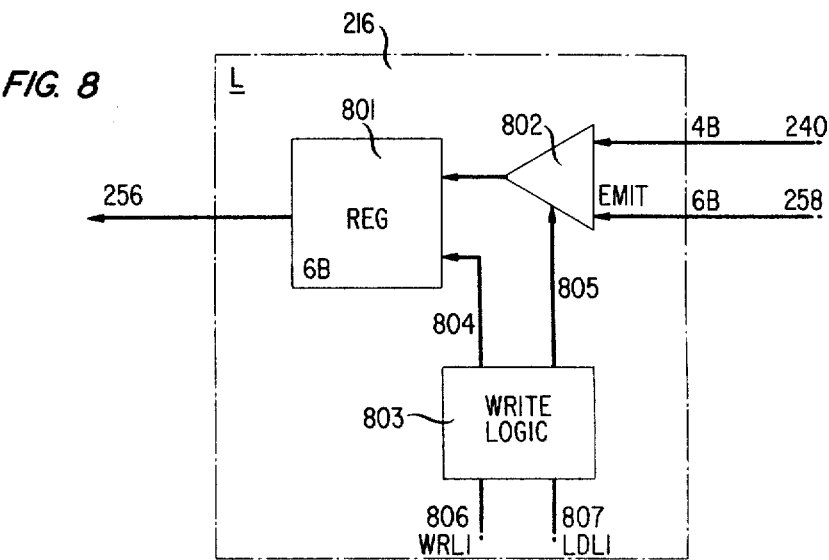
FIG. 8 discloses the details of the L 216 register of FIG. 3.

The L register 216 on FIG. 3 is illustrated in further detail on FIG. 8. The function of this register is to provide the addressing information for the CM and RM memories. The L register includes a register 801, a multiplexor 802, and a write logic element 803. Register 801 is of the 6-bit type and, under control of the multiplexor 802, it can be loaded either from the destination bus 205 via path 240 or from the EMIT field of the decoding logic 226 via path 258. When the register 801 is loaded from the EMIT field, all six bits of the register are loaded. However, when the register is loaded from the destination bus during the byte 0 time, only the lower four bits are loaded and the two most significant bits already in the register are not disturbed. The L register includes two integrated circuits which may be an SN7475 and an SN74298. Only one-half of the SN7475 is used for the two most significant bits and only the two most significant bits of the EMIT fields are data inputs into the SN7475. The four lower bits are stored in the SN74298 which includes the multiplexor 802.

When the 6-bit EMIT field is to be entered into register 801, the decoding logic 226 on FIG. 2 generates the LDL1 signal and applies it to conductor 807. This signal controls the multiplexor 802 via path 805 so that it activates the EMIT input and strobes all six bits of the EMIT field into register 801. The LDL1 signal occurs at the time shown for the control pulse CTLPLS* on the timing diagram of FIG. 28.

Figure 28:
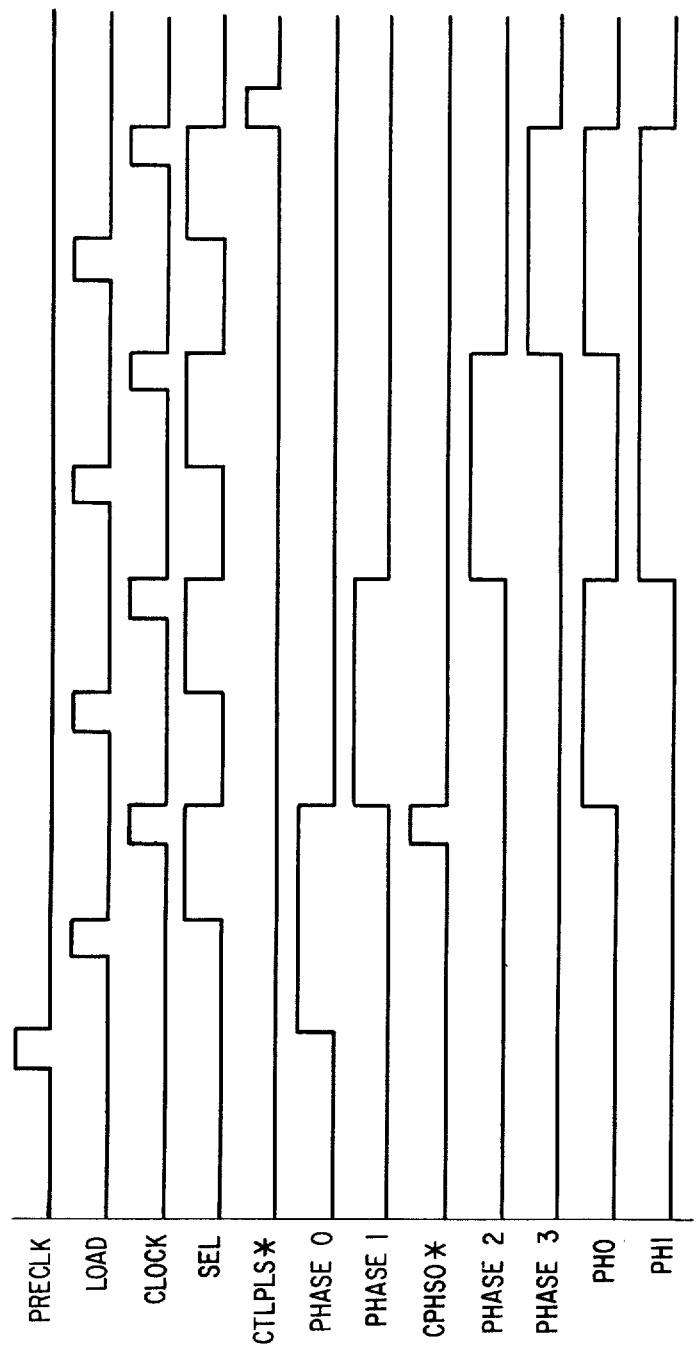
FIG. 28 is a timing diagram which shows the time interrelationship between the various control pulses used by the processor.

If the information on the destination bus 205 is to be written into the low four order bits of register 801, the WRL1 signal is generated by the decoding logic at the phase 0 time and it has a duration equal to that of the clock pulse on FIG. 28 for phase 0. The write logic circuit 803 controls the multiplexor via path 805 so that the bus 240 is selected as the data input into register 801. The output of the register extends over path 256 to the CM and RM memories shown on FIGS. 2 and 3.

Logic element 803 contains the combinatorial gate logic required to apply a strobe or gate signal to path 804 upon the receipt of either a WRL1 or a LDL1 signal. The gate signal enters the output information from multiplexor 802 into register 801. Logic circuit 803 also applies the required potential to 805 upon the receipt of a LDL1 or WRL1 signal.

CM MEMORY — FIG. 9

Figure 9:
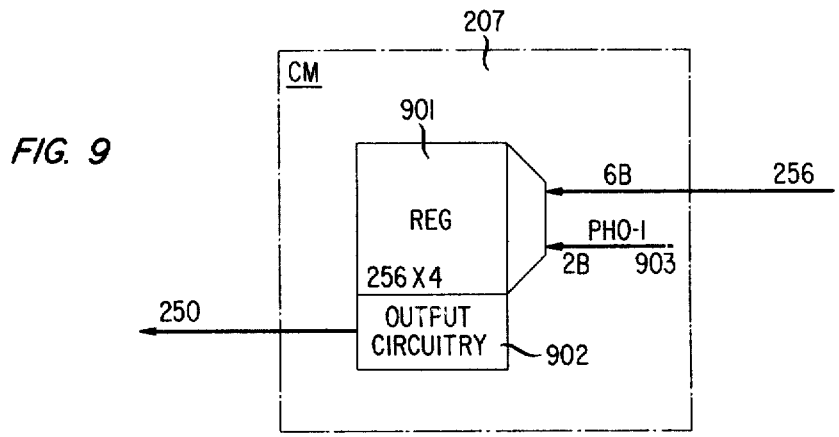
FIG. 9 discloses the details of the CM memory 207 of FIG. 3.

The CM memory 207 of FIG. 3 is shown in further detail on FIG. 9. This memory is a 256 × 4 read-only memory and may advantageously comprise a Harris semiconductor integrated circuit type HPROM-1024. The CM memory basically comprises a register 901 and register output circuitry 902. The addressing information for the register is received over paths 256 and 903. Since register 901 contains 256 address locations, eight bits of addressing information are required to specify a unique location. Six address bits are received over path 256 and these six bits identify the beginning address of the first byte of a word that is to be read out. The remaining two bits — the byte information — are received over path 903. This information represents the phase information and it is received from the timing generator 225. The CM memory constantly outputs the addressed word via the output circuitry 902 onto source bus 1 via path 250.

RM MEMORY — FIG. 10

Figure 10:
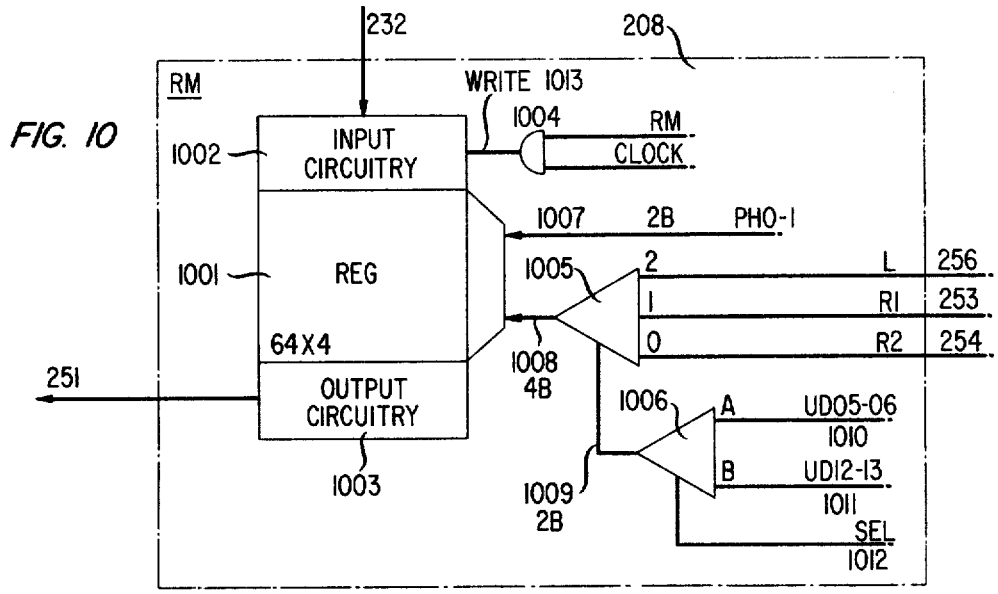
FIG. 10 discloses the details of the RM memory 208 of FIG. 3.

The RM memory 208 of FIG. 3 is illustrated in further detail on FIG. 10. This memory contains 16 general purpose registers. Each register consists of four 4-bit bytes and all the registers together comprise element 1001 on FIG. 10. The RM memory also includes register input circuitry 1002, register output circuitry 1003, AND gate 1004, together with multiplexors 1005 and 1006.

Elements 1001, 1002, and 1003 may advantageously comprise four SN7489 integrated circuits, each of which is a 16 × 4 bipolar memory. These four integrated circuits are organized together as a 64 × 4 bit memory. The addressing information for this memory array is provided by paths 1008 and 1007. Path 1008 receives the output of multiplexor 1005 which comprises 4 to 1 multiplexors type SN74153. Multiplexor 1006 comprises a 2 to 1 multiplexor type SN74153.

The register 1001 functionally provides storage for sixteen 16-bit words each of which comprises four 4-bit bytes. Each word corresponds to one general purpose register. The word address information is provided by path 1008 from multiplexor 1005 and the addressing within the word, namely the byte information, is provided by path 1007 which receives the phase or the byte information from the timing generator 225. The information applied to path 1008 is received by the multiplexor 1005 either on path 256 from the L register, on path 254 from the R2 register, or on path 253 from the R1 register. Two bits of information are used to control which input of the multiplexor 1005 is to be activated. These two selection bits are applied to path 1009 by the output of multiplexor 1006. The inputs of multiplexor 1005 are designated numerically to indicate the value of the binary signal that must be applied to path 1009 to activate each input. Thus, if a binary 1 is applied to path 1009, input 1 is activated and the information on path 253 is extended through multiplexor 1005 and over path 1008 to register 1001. The A and B inputs of multiplexor 1006 are connected over paths 1010 and 1011 to the decoding logic circuitry 226. The A input of multiplexor 1006 receives the least two significant bits (5 and 6) of the source 1 (S1) field of the microstore 222 for an instruction of the type indicated on FIG. 25 or 26. The B input of the multiplexor receives the least two significant bits (12 and 13) of the destination field (DES) of a microinstruction of the type indicated on either FIG. 25 or 26. Path 1012 extends to the timing generator and the signals applied to it determine which input of multiplexor 1006 is to be active. When the SEL conductor is a 0, the A input is activated; when the SEL conductor is a 1, the B input is activated.

The overall function of the two multiplexors is to allow the S1 and DES fields of a microinstruction to select either the L register, the R1 register, or the R2 register as the addressing source for the RM register. Thus, the microprogrammer can specify not only the fact that the RM memory is going to be a source or a destination circuit, but he can also specify which of the three possible sources of address information are to be used to control the RM memory.

A word is written into register 1001 by placing the desired data on path 232 from the destination bus, by extending the required address information through multiplexor 1005 to register 1001 over path 1008, and by causing the write lead 1013 to go true. This lead is controlled by the logical AND of the RM and clock signals into gate 1004. The RM signal is supplied by the decoding logic 226; the clock signal is supplied by the timing generator with the signal being of the type indicated on FIG. 28. Whenever register 1001 is not being written into, the output circuitry 1003 constantly applies over path 251 to the source 1 bus the contents of the word currently being addressed by the signals on path 1008.

The RM signal is received from the decoding logic circuit 226 and is present during all four phases of a machine cycle whenever a binary 0, 1, or 2 appears in the destination field for an instruction of the type indicated in FIGS. 25 and 26. The timing of the clock signal is shown in the timing diagram.

In summary, a clock signal and an RM signal into gate 1004, together with the partial destination field information into the B input of the multiplexor 1006, determine the circuit that is to be used in supplying address information into the RM memory on a write operation. The RM memory on these operations is the destination for the information currently applied to the destination bus. The A input of multiplexor 1006 comprises a portion of the S1 field of a microinstruction and when the A input is active the S1 field specifies which circuit element of the processor is to be used as a source to supply addressing information to the RM memory. The contents of the addressed RM memory are then applied to the source 1 bus. When the B input of multiplexor 1006 is active the DES field specifies the source of the addressing information for the RM memory.

TM MEMORY — FIG. 11

Figure 11:
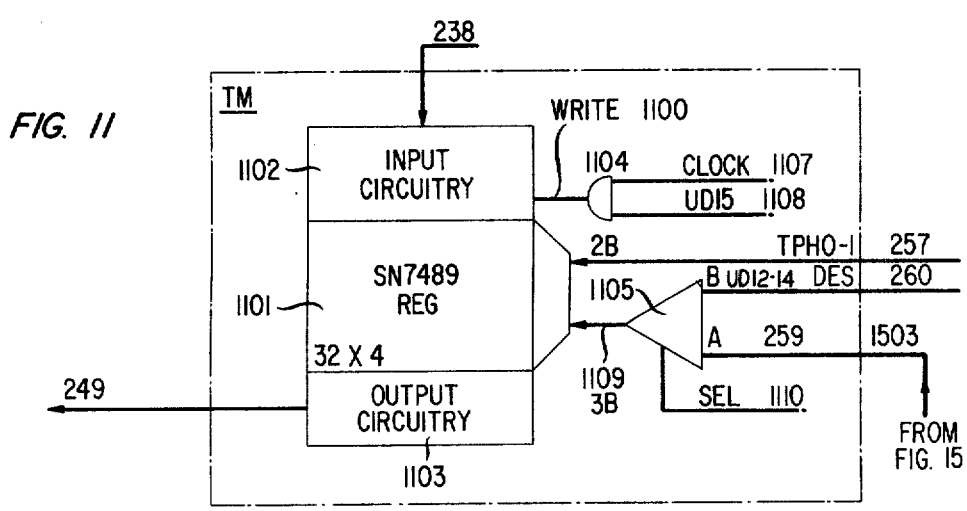
FIG. 11 discloses the details of the TM memory 206 of FIG. 2.

The TM memory 206 on FIG. 2 is shown in further detail on FIG. 11. This memory basically comprises a register 1101, input circuitry 1102, output circuitry 1103, AND gate 1104, and multiplexor 1105.

The TM memory provides special purpose registers for the processor and, in particular, for the microprogram portion of the processor. Elements 1001, 1002, and 1003 may advantageously comprise two type SN7489 integrated circuits. These are organized to form a 32 × 4 memory which is the equivalent of eight registers, each having 16 bits of information. Five binary bits are required to provide address information. Path 257 (TPHO-1) provides the least two significant address bits. These signals are received from the TPA register 217 and they comprise the byte information. The output of multiplexor 1105 provides the three most significant bits.

The three addressing information bits provided by the multiplexor may be selectively received either from path 259 or path 260. The signals applied to these paths are received from the microstore 222. Path 259 is also designated path 1503 and it extends to FIG. 15. The information on path 1503 may be either bits 5–7 or 9–11 of a microinstruction of FIGS. 25 or 26. Multiplexor 1505 on FIG. 15 operates as subsequently described in detail to apply either bits 5–7 or 9–11 to path 1503. The information on path 260 is bits 12–14 of the destination (DES) field of the microinstruction of FIGS. 25 and 26. The multiplexor, which may be an integrated circuit type SN74153-device, selects the input from path 259 when the SEL input 1110 is a 0 and selects the input from path 260 when the SEL input is a 1. The SEL signal is supplied by the timing generator 225. The SEL signal determines whether the processor is in the load subphase or the clock subphase of a microinstruction. The output circuitry 1103 constantly applies the contents of the word location specified by the address information to path 249 at all times except when the write signal on path 1100 from gate 1104 is active.

The writing of a word or a byte of a word in register 1101 is accomplished by applying address information to the 1109 input of register 1101 and by then applying a write signal via path 1100 to the input circuitry 1102. The data written into register 1101 is that present on path 238 which extends from the destination bus 205. The write signal on path 1100 is the logical AND of the clock signal on path 1107 and the UD15 signal on path 1108. The UD15 signal is the fifteenth bit of the microinstruction of FIGS. 25 and 26.

Let it be assumed that on a given operation the TM memory for a particular microinstruction is to be both a source and a destination. The phase signals representing the byte address information are received on path 257. The remaining addressing information is provided by multiplexor 1105. During the load subphase, the address information on the output of the multiplexor will be supplied by path 259 since the TM memory is a source circuit on this subphase. In response to this addressing information from path 259, the output circuitry 1103 places the contents of the addressed word onto path 249 extending to source bus 2.

The AMU receives the signals from the source bus, processes them, and applies the processed signals to destination bus 205. From there, it is assumed that these signals are to be written into the TM memory. On a write operation into the TM memory the address information is supplied via the multiplexor from path 260 during the clock subphase. The write signal on path 1106 is generated at the time of the clock pulse for the subphase as shown on the timing diagram.

DATA REGISTER — FIG. 12

Figure 12:
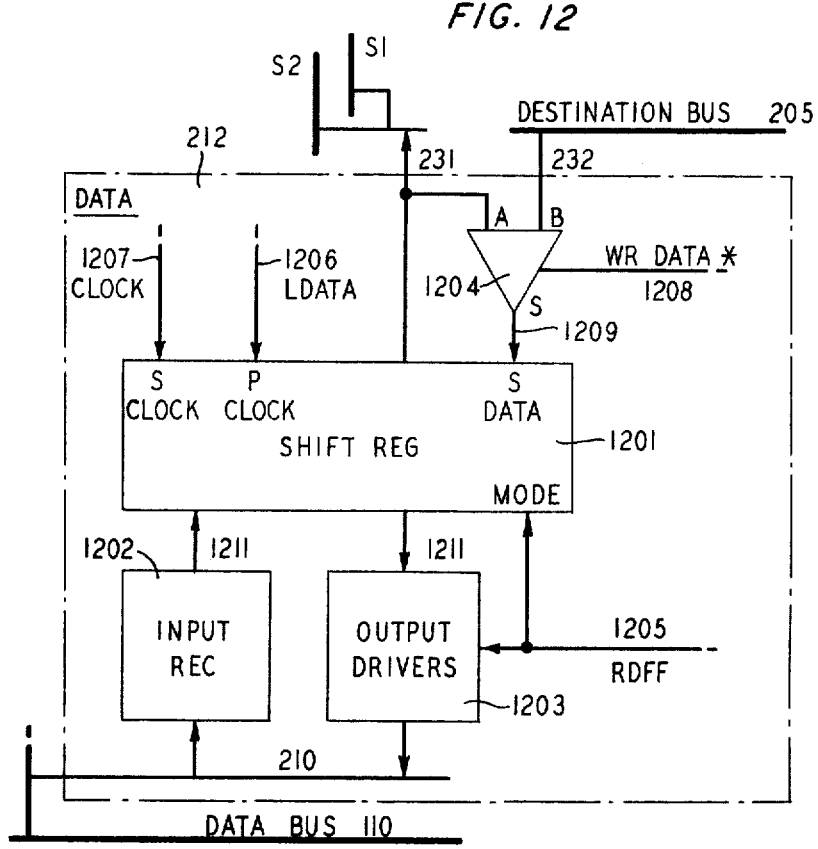
FIG. 12 discloses the details of the data register 212 of FIG. 3.

The data register 212 on FIG. 3 is illustrated in further detail on FIG. 12. This circuit basically comprises shift register 1201, input receiver 1202, output drivers 1203, and multiplexor 1204.

The data register has four functions. It applies to and receives information or data from data bus 110; it applies information over path 231 to the source 1 and source 2 buses; it also receives information via path 232 from the destination bus. Data is applied to and received from the data bus 110 in 16-bit parallel form. It is outputted to the source buses and received from the destination bus in a 4-bit byte format.

Information or data is loaded into the shift register 1201 from bus 110 whenever the system is performing a read memory or a read I/O command. This condition is indicated by a true signal on the RDFF conductor 1205 which extends to the output drivers 1203 and to the MODE input of shift register 1201. This signal prepares the shift register to receive information from the data bus. The RDFF signal is the logical OR of the fact that a read data flip-flop, a read instruction flip-flop, or a read I/O flip-flop in the control flip-flops 226 is set. These three flip-flops are set under control of the microprogram via the control field of the microinstruction. The true state of the RDFF signal on path 1205 disables the output drivers 1203. The RDFF signal conditions the shift register to receive parallel data from the input receivers 1202 when the signal on conductor 1206 goes high and then subsequently goes low. This loads the shift register with parallel data from the input receivers 1202. The signal on conductor 1206 is designated LDATA. This signal is generated when the memory system 102 returns a memory complete signal over path 112 on a read memory operation. For a read I/O operation, a bit pattern in the control field of the microinstruction generates the LDATA signal. This signal effectively connects data bus 210 via the input receivers 1202 to the parallel data inputs of the shift register 1201. The shift register is composed of four SN7495 devices organized as a 4 × 4 memory. The signals on paths 1207, 1206, 1209, and 1205 extend to the corresponding input of all the four 41CF-type integrated circuits which make up the shift register.

The contents of the shift register are continuously placed on the data bus 210 via the output drivers 1203 whenever the RDFF signal on path 1205 is not true. Thus, it is not necessary for the processor to generate any additional signals in order to perform a write memory or a write I/O operation with respect to the data bus.

The shift register receives data from the destination bus 205 and applies data to the source buses under control of the clock pulses received over path 1207. These pulses are the clock pulses shown on FIG. 28. There is one such clock pulse for each phase of the machine cycle. Each reception of a clock pulse causes information to be shifted in the shift register 1201 in a byte-by-byte form. With respect to the destination bus, if the data register is not the destination specified by the microinstruction, then the signal on path 1208 is low. This causes the multiplexor 1204 to activate its A input which is connected to the output of the shift register on path 231. This results in the data bytes in the shift register being recirculated byte by byte as each clock pulse is received.

If the shift register is the destination as specified by the microinstruction, then the signal on conductor 1208 is high, the multiplexor activates its B input and the signals on the destination bus are extended through the multiplexor and over path 1209 to the input of the shift register. The clock signal on path 1207 is present during each phase and the reception of this signal for a phase enters the byte information from the destination bus into the shift register.

Data is applied over path 231 to the appropriate source bus when the data register is designated as the source by microinstruction. This data is always available since the shift register information is constantly being recirculated and applied to its output on path 231 during each phase of a machine cycle.

The input receivers are SN7404 devices; the output drivers are four SN7426 devices. The multiplexor is an SN74157 device.

SC AND TPA REGISTERS — FIG. 13

Figure 13:
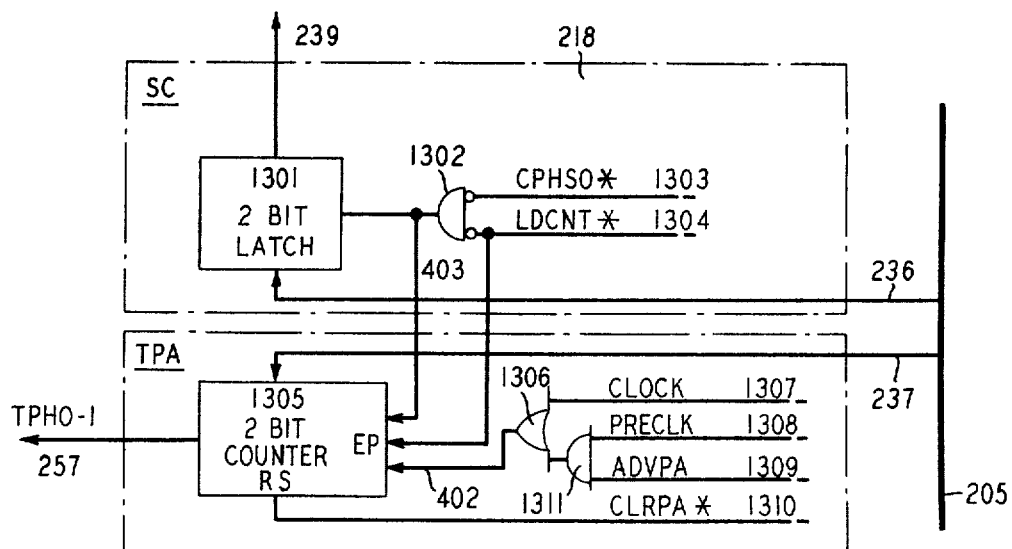
FIG. 13 discloses the details of the SC and TPA registers 218 and 217 of FIG. 2.

The SC and TPA registers, which are designated as elements 218 and 217 respectively on FIG. 2 are illustrated in further detail on FIG. 13. The overall function of the SC register is to store two of the four bits of binary information received on shift and rotate operations to specify the number of bit positions that the shifter circuit 1651 of FIG. 5 is to shift the binary information applied to its inputs. Since the SC register stores two bits of information, it can indicate a bit shift of 0, 1, 2, or 3 bits.

The SC register is a 2-bit latch circuit composed of one-half of an SN7475-type integrated circuit. The input into the SC register is the least two significant of the four bits of the shift information applied to the destination bus 205. The output of the SC register is applied over path 239 back into the AMU 202 to cause the shift circuit 1651 to perform the required amount of bit shifting.

When the SC register is to receive information from the destination bus, the signal on path 1304 is true. The signal on path 1303 is true during the clock signal of phase 0 shown on FIG. 28. The AND gate 1302 turns on when both of the signals applied to its input are true. At that time, the two lower-order bits of shift information on the destination bus are applied over path 236 and are gated into latch circuit 1301 for subsequent use by the AMU.

The TPA register 217 includes a 2-bit counter 1305 and gates 1306 and 1311. Counter 1305 may be an SN74161 device. The function of the TPA register is to generate the phase or byte information required by the TM memory. Counter 1305 is incremented every time the clock signal on path 1307 makes a positive to negative transition. This signal is extended through gate 1306 and over path 402 to counter 1305. The counter advances from the clock signal only when the LDCNT* signal is high. The counter is cleared and reset to 0 when a low is applied to conductor 1310 extending to the RS input of the counter. The reset signal on path 1310 is generated by the decoding logic 226 on FIG. 2. This signal is generated by the decoding logic in response to the information contained in the control field of a microinstruction.

Counter 1305 is also advanced by gates 1306 and 1311 whenever a signal is concurrently applied to both conductors 1308 and 1309. This mechanism for advancement is provided for a 0- to 3-bit shift operation. The signal on path 1309 is generated by the AMU circuit and, particularly, by the AROM element 1602 within the AMU circuit. The signal occurs on path 1308 at the preclock time shown on the timing diagram. The TPA register can be loaded in parallel with the SC register. This is done over path 403 which extends from the output of gate 1302 within the SC register through the control logic 1306 to the input of counter 1305. At that time, the complement of the two high-order bits on bus 205 are loaded into the TPA register over path 237.

SOURCE BUS 1 — FIG. 14

Figure 14:
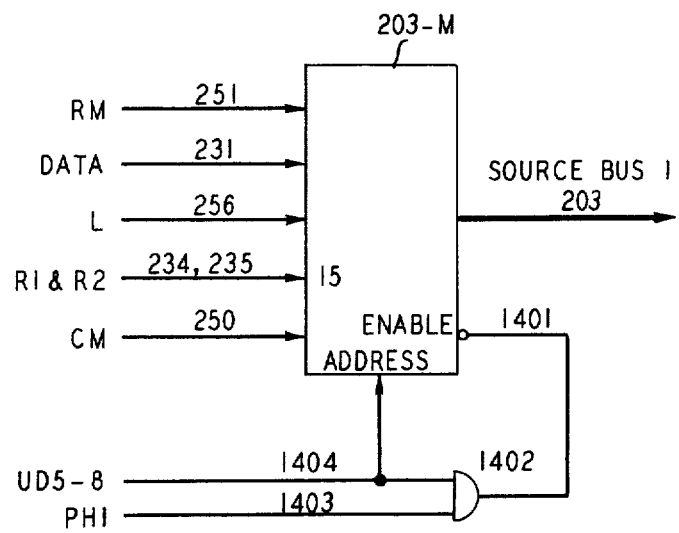
FIG. 14 discloses the details of the source bus 1 of FIGS. 2 and 3.

FIG. 14 illustrates further details of source bus 1. As shown on FIGS. 2 and 3, source bus 1 is connected to the output of multiplexor 203-M whose inputs are connected to the various circuits that can apply information via the multiplexor and over source bus 1 to the AMU. On FIG. 14, the inputs to multiplexor 203-M are shown on the left and extend from the RM memory 208, from the data register 212, from the R1 and R2 registers 209, and from the CM memory 207. The output of the multiplexor is shown on the right and is the source 1 bus 203 which extends to the AMU 202. AND gate 1402 and the signals applied to conductors 1403 and 1404 control the multiplexor 203-M and determine which of the source circuits connected to its inputs can, on any machine operation, extend their output information through the multiplexor to bus 203. Path 1404 recieves the bits 5 through 8 of the microinstruction S1 field. On FIG. 25 these bits specify which circuit connected to the input of the multiplexor is to be a source and apply its information to the bus 203. The four bits applied to path 1404 constitute addressing information and determine which input of the multiplexor is to be active.

The input to the multiplexor from the R1 and R2 registers comprises paths 234 and 235 which terminate at an input terminal numerically designated as 15. This numerical designation signifies that this input is activated whenever a binary address of 15 is applied to path 1404. With reference to FIG. 3, the two bytes stored in registers R1 and R2 together are applied to the source buses in sequence byte by byte. With reference to FIG. 7 and, in particular with reference to conductor 704 extending to the control input of the multiplexor 701, the output of the R1 register is applied via the multiplexor to paths 234 and 235 during the phase 0 time. From FIG. 28, the PH0 signal is not true at this time and therefore the upper input of the multiplexor is active. During the phase 1 time, the PH0 signal goes true as indicated on FIG. 28 and the lower input of multiplexor 701 is activated so that the output of register R2 is applied via the multiplexor to conductors 234 and 235.

On FIG. 14, terminal 15 of multiplexor 203-M receives the R1 register contents during the phase 0 time and the R2 register contents during the phase 2 time. It is required that, for the remaining two phases of a cycle, namely for bytes 3 and 4, that the output of multiplexor 203-M be a 0. This is accomplished by the PH1 signal into AND gate 1402. On FIG. 28, the PH1 signal is high during the phase 3 and phase 4 times; this turns on AND gate 1402 and over path 1401 applies an inhibit potential to the multiplexor. This causes multiplexor 203-M to apply zeros to bus 203 from its output during the byte 3 and byte 4 times. Gate 1402 responds only to a binary 15 (1111) since only at that time are all of its UD5-8 inputs high.

The PH1 signal into AND gate 1402 is effective as an inhibiting mechanism or 0 generating mechanism at the output of multiplexor 203-M only when a binary 15 is applied to path 1404 to select the number 15 of the input of the multiplexor. When any other input of the multiplexor is activated, a binary 15 is not applied to path 1404 and, thus, the AND gate 1402 cannot be turned on even though PH1 does go high during the phase 3 and phase 4 times of all machine cycles. Thus, the four bytes of information that are applied to the input of the multiplexor by all of the other source circuits are extended through the multiplexor when the appropriate input is activated and applied on its output to bus 203.

SOURCE BUS 2 — FIG. 15

Figure 15:
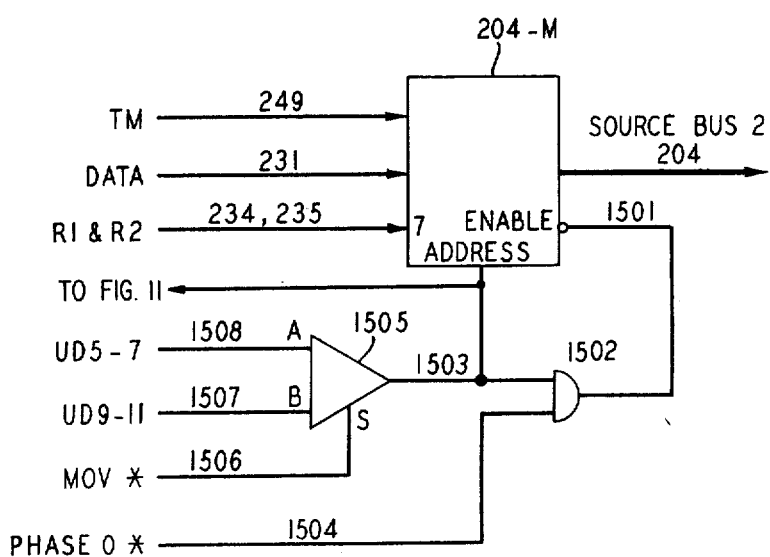
FIG. 15 discloses the details of the source bus 2 of FIGS. 2 and 3.

Source bus 2 is shown as element 204 on FIGS. 2 and 3 and is illustrated in further detail in FIG. 15. The source bus includes bus multiplexor 204-M together with an address controlling multiplexor 1505 and gate 1502. On FIGS. 2 and 3, multiplexor 204-M can receive data or information from the TM memory 206, the data register 212, as well as the R1 and R2 registers 209. The output of multiplexor 204-M is applied over the source bus 2 conductors to AMU 202. Multiplexor 1505 determines whether the address information that controls multiplexor 204-M shall be that received from path 1508 or from path 1507. The signals on path 1506 determine which input of multiplexor 1505 shall be active.

With reference to FIGS. 25 and 26, path 1507 and input B of the multiplexor are activated on an arithmetic type instruction and at such times the contents of the S2 field (UD9-11) are applied as address information from multiplexor 1505 over path 1503 to the address input of multiplexor 204-M. On a move-type instruction of FIG. 26, input A is activated and bits UD5-7 apply the addressing information through multiplexor 1505 to multiplexor 204-M.

Path 1503 also extends to FIG. 11 where it is connected to input A of multiplexor 1105. This permits multiplexor 1505 and its associated circuitry to control the addressing of the TM memory whenever this memory is to be a source circuit for source bus 2 information.

With respect to conductor 1504, it is the complement of the phase 0 signal and it is high during bytes 1, 2, and 3. The high on this conductor at this time, together with a 7 on path 1503 turns on gate 1502 and inhibits the bus multiplexor so that it supplies all zeros out on its output conductor 204 to the AMU during the phase 1, 2, and 3 times. This feature is used on the microinstructions of FIGS. 25 and 26 whenever the R1 and R2 registers 209 are the source circuits. These are connected to input 7 of multiplexor 204-M. Only the contents of register R2 are used and the contents of register R1 are ignored whenever register 209 is a source circuit. During the phase 0 time, the contents of register R2 are supplied to the 7 input of the multiplexor which is activated at this time by a binary 7 on path 1508 and high on path 1503. Consequently, the R2 contents are supplied over bus 204 to the AMU.

Path 1504 is low during the phase 0 time. This path goes true for the remaining phases and turns gate 1502 on since a binary 7 is still on path 1503. This inhibits the multiplexor 204-M via path 1501 and causes the multiplexor to generate all zeros during the times for phases 1, 2 and 3.

AMU — FIG. 16

Figure 16:
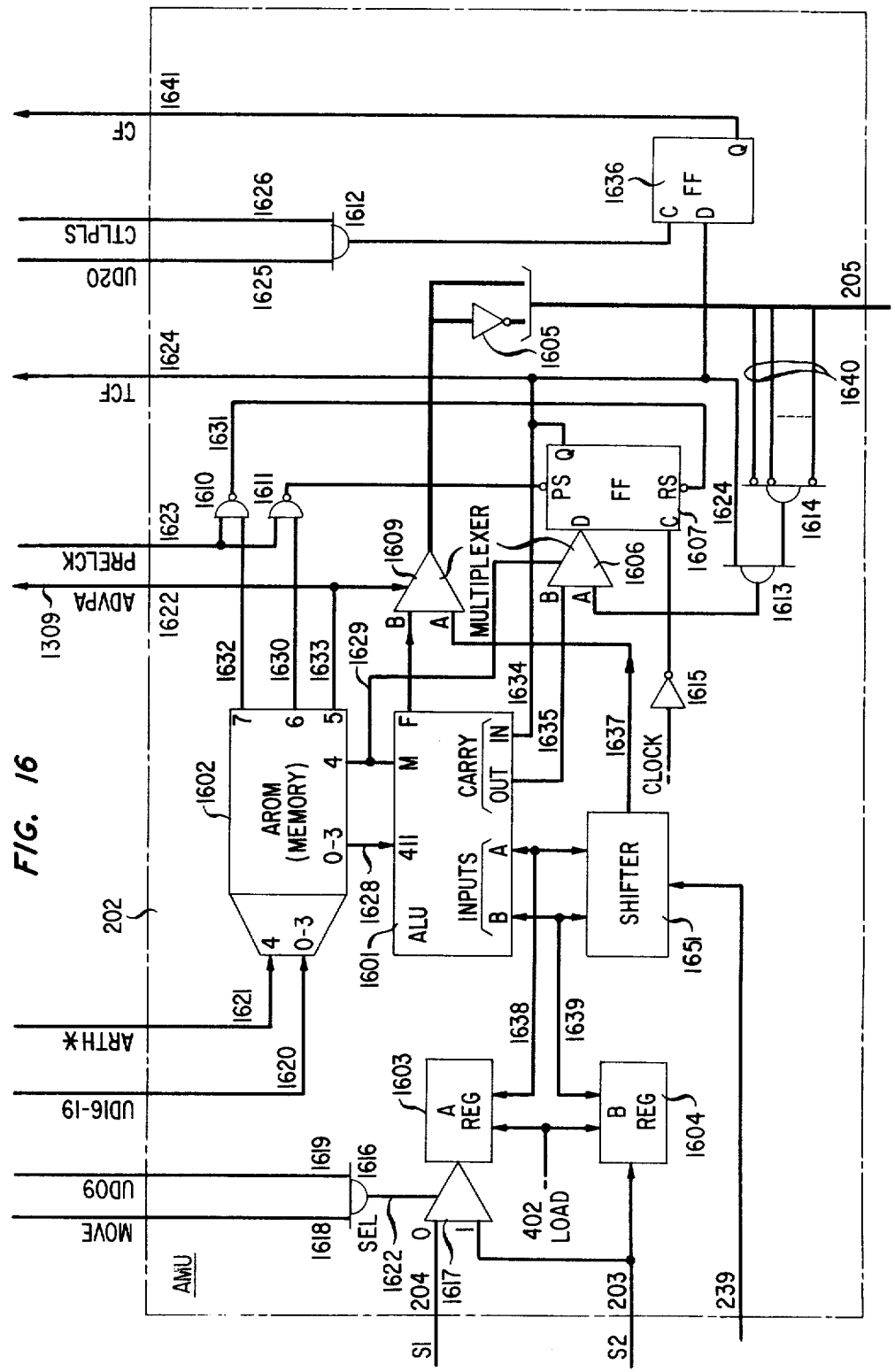
FIG. 16 discloses the details of the arithmetic unit (AMU) 202 of FIG. 2.

The arithmetic unit (AMU) of the processor, element 202 on FIG. 2, is illustrated in further detail on FIG. 16. The AMU is the arithmetical and logical heart of the processor; all data and information transferred between elements of the processor must go through the AMU. The AMU includes an A register 1603 and a B register 1604 which on arithmetic type microinstructions receive information from buses 204 and 203 respectively. The contents of the source 1 bus 204 are extended through multiplexor 1617 to the A register; the contents of the source 2 bus 203 are extended directly to the B register 1604. This loading of the A and B registers from the source buses occurs during the load pulse time indicated on the timing diagram. The actual loading takes place on the positive- to negative-going transition of the pulse.

During a move-type microinstruction, the information on either the source 1 or source 2 bus is loaded into the A register on the fall of the load pulse. The B register is not used on move type microinstructions. The information on the source 1 bus is loaded into the A register when the 0 input of multiplexor 1617 is activated; the information on source 2 bus is loaded into the A register via the multiplexor when the 1 input is activated. The input selection lead 1622 is controlled by gate 1616 which ANDs the MOVE signal and a UDO9 signal. A high on the MOVE lead signifies that a move-type instruction is being performed. The UDO9 signal is bit 9 of the move instruction of FIG. 26. When this signal is a 0, the source 1 bus is connected to the A register via the multiplexor; when it is a 1, source 2 bus is connected by input 1 of the multiplexor to the A register. Gate 1616 prevents the information on source 2 bus from being selected by the multiplexor during arithmetic-type microinstructions. The source 1 bus input is selected at such times by input 0 of multiplexor 1617 since the MOVE lead is low during arithmetic instructions.

The A register and the B register are each composed of Texas Instrument SN74298 integrated circuits. The SN74298 integrated circuit has the 2 to 1 multiplexor 1617 as an integral part of its circuit. This capability is not used with the B register and only one input, namely that from the source 2 bus, is permanently selected as an input to the B register.

The outputs of the A and B registers are applied over paths 1638 and 1639 to the inputs of both the ALU 1601 and the shifter 501. The output of the ALU is applied from its F terminal to the B input of multiplexor 1609; the output of the shifter is applied over path 1637 to the A input of the multiplexor. Under control of the signals on path 1633 from the AROM, the signals on either the A or the B input of the multiplexor may be selectively extended through multiplexor 1609 to the destination bus 205. The ALU is also used on move operations. On these it receives the output of the A register, performs the required move operations, and extends the results of these operations through multiplexor 1609 to the destination bus. The ALU is composed of one SN4181-type integrated circuit; the shifter is composed of two SN74153-type integrated circuits.

The shifter 501 is used on shift operations. On these, it concurrently receives the outputs of the A and B registers, shifts four bits of this received information the required number of positions on each byte, and applies the four shifted bits to input A of multiplexor 1609 and through the multiplexor to destination bus 205. The two bits that specify the magnitude of the required shift are received by the shifter from the SC register 218 over path 239.

FIG. 27 discloses in truth table form the various functions the AROM 1602, the ALU 1601, and the shifter 501 together perform in response to the input stimuli received by the AROM in the form of address information. The two leftmost columns of FIG. 27 represent the address information received by the AROM on each operation it controls. The most significant bit of the AROM address information is shown in the first column and this bit is received by conductor ARTH* over path 1621. When this bit is true (a 0), it indicates that an arithmetic type microinstruction is to be performed. These instructions are represented by the addresses 0 through 15 in the second column of FIG. 27. The four least significant bits of the address information are indicated in the second column. These four bits are applied to path 1620; they comprise the contents of the arithmetic field of a microinstruction of the type indicated in FIG. 25.

With respect to the second column of FIG. 27, addresses 0 through 5 specify logic type operations or functions with each such function being identified or characterized in the fourth column from the left. Addresses 6 through 12 comprise arithmetic and left shift by 1 type instructions of the type indicated in the third column from the left. Addresses 13 and 14 are blank and are not used. Address 15 is a shift operation of any controlled magnitude. Addresses 16 through 31 are identical to each other and they comprise move-type operations. The third column from the right on FIG. 27 indicates the input of multiplexor 1609 that is activated for each of the various addresses; the second column from the right indicates the input of multiplexor 1606 that is activated on each address; the rightmost column indicates the state to which flip-flop 1607 is switched during the preclock interval for each of the various addresses. The move instructions indicated in addresses 16 through 31 are all identical to each other and, therefore, only the details of instruction 16 are shown. FIG. 27 illustrates only the AMU functions for which the ALU 1601 is involved. The shift operations performed by shifter 501 are not shown on FIG. 27 since they do not involve the ALU.

In order to describe the operation of the AMU in further detail, let it be assumed that the AMU is executing one phase of an arithmetic-type instruction of FIG. 25; let it further be assumed that the load subphase has already been performed. This means that the A and B registers 1603 and 1604 have received data from the source buses. This being the case, the data from these registers, which is the data that now is to be operated upon, must be extended either through the shifter circuit 501 to the appropriate input of multiplexor 1609 and from there through the multiplexor to the destination bus 205. The nature of the arithmetic instruction that must now be performed determines whether the contents of the A and B registers are to be extended through the ALU or through the shifter and, in turn, to the multiplexor 1609. The ALU is used on functions of the type indicated in FIG. 27 (left shift by 1, arithmetical, or logic functions); the shifter is used on all shift-type operations other than that shown for address 12.

In order to describe a typical processor operation, let it be assumed that the add-type instruction shown for address 7 is to be performed. In this case and shown on FIG. 27, the AROM applies the required output signals over paths 1628 and 1629 to the upper two inputs of the ALU to condition it to perform the add operation. At this time as indicated for address row 7 of FIG. 27 input B of multiplexor 1609 is activated, input B of multiplexors 1606 and 1609 are activated, and flip-flop 1607 is placed in a reset state. In order to accomplish these functions, a high is placed by the AROM on conductor 1633 to select the B input of multiplexor 1609; a high is applied to conductor 1629 to select the B input of multiplexor 1606; conductor 1632 receives a high; conductor 1630 receives a low. These signals together place the flip-flop 1607 in a reset condition.

The circuit operations just described condition the ALU and the remaining circuitry on FIG. 16 to perform an add operation. The activation of the B input of multiplexor 1609 effectively selects the F output of the ALU. The F output at this time, as shown on FIG. 27, is the sum of the A and B inputs; this output information is extended through multiplexor 1609 and applied to the destination bus 205. If the sum of inputs A and B requires a carry for the next byte, this carry signal is applied by the ALU over conductor 1635 to the B input of multiplexor 1606. From there it is extended to the D input of the flip-flop 1607. At the clock time, as shown on FIG. 28, the carry or no carry state of the byte just processed by the ALU is clocked into the flip-flop. If a no carry condition is specified, the flip-flop is left in a reset state. The flip-flop is put in a set state if a carry condition signal is received in the form of a high on the D input. The carry or set condition of the flip-flop is used on the next nibble by the ALU and is received in the form of a signal applied from the Q output of the flip-flop over conductor 1634 to the CARRY IN input of the ALU.

The information that is applied to the bus 205, which is the destination bus, is entered into one of the destination circuits connected to the destination bus. This can be, for example, the TM memory, the CM memory, the RM memory, the SC register, the SAR register, or the data register.

Subsequent bytes of the 4-byte word are added together and processed by the AMU in a manner similar to that already just described for the first byte. If the last byte contains a carry, this is indicated by flip-flop 1607 and the carry state of the flip-flop 1607 causes flip-flop 1636 to be set. This applies a single indicating this state to the CF output conductor 1641 of the AMU. Flip-flop 1636 is set only if both inputs of gate 1612 are high at this time.

The preceding operation has just described how the AMU performs an add operation. With reference to FIG. 27, an address input of 15 specifies a right shift operation. This operation does not use the ALU. The receipt of this address by the AROM selects inputs A of both multiplexors 1609 and 1606 and also sets flip-flop 1607. The shift circuit 501 now receives the contents of the A and B registers, it shifts this information by the number of bit positions specified by the signals received over path 239 from the SC register 218, and it applies a 4-bit byte representing the shifted contents over path 1637 to the A input of multiplexor 1609. From there, the shifted byte is applied through the multiplexor to the destination bus 205.

The all zero state of the destination bus is detected for certain logical operations the processor performs. This is accomplished by means of gates 1614 and 1613 with the output of gate 1613 being applied to the A input of multiplexor 1606. As long as all zeros are detected on each byte, the flip-flop 1607 remains in a set state. However, it is switched to a reset condition upon the occurrence of a nonzero condition on the destination bus. It cannot then be set on the same operation.

A move-type microinstruction of FIG. 26 causes the AMU to operate in a manner similar to that already described with the following exceptions. The ALU is conditioned by conductors 1628 and 1629 to receive the contents of the A register and transfer them to the F output of the ALU with no modification. Multiplexor 1606 has its A input activated and it receives the output of gate 1613 to detect all zero conditions on the destination bus in a manner already described. Multiplexor 1609 has its B input activated to receive the F output of the AMU and place this output on the destination bus 205. Flip-flop 1607 was priorly put in a set state during the preclock time as indicated on the right-hand column of FIG. 27 for a move-type instruction of AROM addresses 16 through 31. With the AMU conditioned as described, each byte is loaded into the A register 1603 and then transferred via the AMU and the multiplexor 1609 to the destination bus. Should a non-zero byte be encountered on any phase, flip-flop 1607 is reset to a zero and this zero is maintained in the flip-flop. This facility is useful for reasons not relevant to the present invention.

FIG. 17 — MAC COUNTER 220

Figure 17:
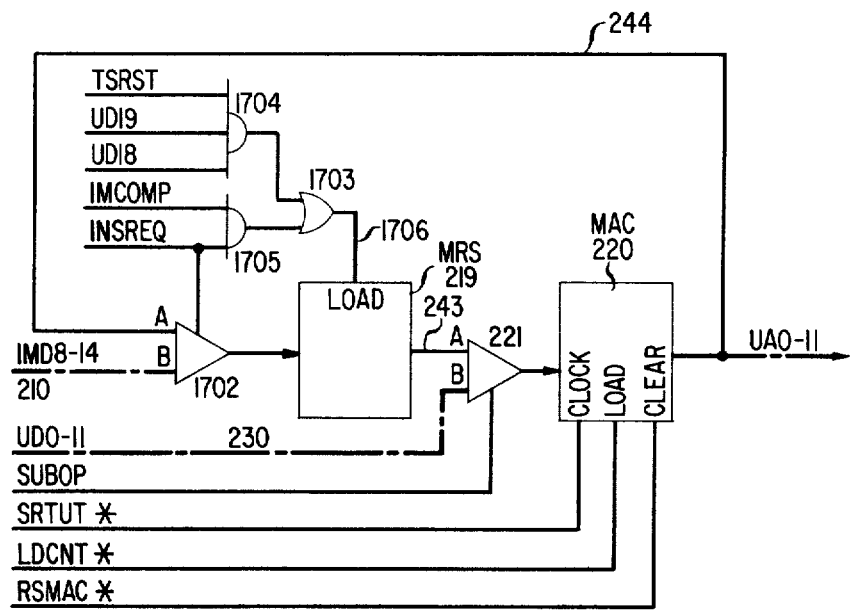
FIG. 17 discloses the details of the MAC and MRS registers 219 and 220 of FIG. 2.

FIG. 17 discloses further details of the MAC (microaddress counter) counter 220, multiplexor 221, register 219 as well as the control circuitry associated with these elements. Counter 220 is a 12-bit binary counter which can be parallel-loaded 12 bits at a time, incremented by 1, or which can be cleared to an all zeros condition. The Clear input receives the RSMAC* signal and the reception of this signal clears the counter. This condition typically occurs during a software interrupt or upon the detection of a hardware error condition. Since this signal can be received at any time it is of the asynchronous type. The Load input of the counter is connected to the LDCNT* conductor; the Clock input is connected to the SRTUT* conductor. The Load and the Clock inputs are of the synchronous type. If the Load input is low upon the negative to positive transition of the Clock input, the output of multiplexor 221 is loaded in parallel into counter 220. If the Load input is high during the negative to positive transition of the Clock input, counter 220 is merely incremented by one. The counter 220 comprises three Texas Instrument-type SN74161 integrated circuits;

multiplexor 221 comprises three Texas Instrument-type SN74157 integrated circuits.

Multiplexor 221 has inputs designated A and B with the A input being connected over path 243 to the output of the MRS counter 219. The B input is connected to path 230. The multiplexor 221 applies the B input information to its output when the SUBOP control signal is high; the A input information is applied to its output when the SUBOP signal is low. The B input receives the output of the microstore 222 over conductors UD0 through UD11 of path 230. This information represents the address of the next microinstruction.

The output of register 219 can represent the return address of a microsubroutine, as received from the counter 220 over path 244 and the input A of multiplexor 1702. Alternatively, it can represent the seven bits of the program OP code the multiplexor 1702 receives on its B input over path 210 from the data bus. As shown in FIGS. 21 through 24, these seven bits of OP code are in bit positions 8 through 14 of the program words the processor receives from the memory system 102 of FIG. 1.

The OP code instructions are applied over path 210, through multiplexor 1702, register 219 and multiplexor 221 to the MAC counter 220. Each OP code uniquely specifies the beginning word of a block of words comprising a different microprogram routine in the microstore 222. The reception of a particular OP code by the MAC counter moves the microstore 222 to the beginning word of the block of words required for the processor to perform the work specified by the OP code. In performing this work, the words of the required block are accessed sequentially one after another by the MAC counter 220. No addressing information at this time is required by the MAC counter from multiplexor 221 since the counter is automatically incremented one step at a time whenever the Load input is high during a negative to positive transition of the Clock input. Therefore, for all microstore addressing functions in which the immediate next word of a microstore program is to be accessed, the MAC counter is incremented one step at a time by this expedient. No addressing information need be received by counter 220 until it is desired to jump the microstore 222 to a location that is not next is sequence and is the beginning of a different routine or subroutine.

The following describes how the circuitry of FIG. 17 saves the return subroutine address from the microstore. Let it be assumed that the microstore control system has performed the work function required for a particular microword; let it further be assumed that the MAC counter 220 has been incremented one count as already described; and let it be further assumed that the last word readout of the microstore 222 requires a jump to a microstore subroutine. At this time, the control conductor INSREQ into multiplexor 1702 is driven low to activate its A input. The A input information is now gated into the MRS counter 219 via a signal on path 1706. This information comprises the address information on path 244 and it indicates the position to which the MAC counter has been incremented. At the same time, the B input of multiplexor 221 is activated by driving control conductor SUBOP high. Input B at this time receives over path 230 the output of microstore 222. This output specifies the microstore address location of this subroutine to which the microstore system should jump. This information is applied by a multiplexor 221 to the MAC counter 220 which, in turn, jumps the microstore 222 to the specified microsubroutine address location.

Multiplexor 1702 operates in such a manner that whenever signal INSREQ is low, the A input of the multiplexor is activated and the information on path 244 from the output of the MAC counter is loaded into register 219. This loading takes place when all inputs to gate 1704 are true. This drives the Load input of the MRS register 219 true via gate 1703 and the output of MAC is then loaded into the MRS register. As already described, this operation is performed just before a jump to a subroutine request is executed. By this expedient, the 219 register stores the subroutine return The subroutine work is now performed with the microstore and the MAC counter being incremented one step at a time to access sequentially the words comprising the subroutine. The end word of each subroutine constitutes an "end of subroutine" command. This command causes the address information that is stored in the MRS counter 219 to be gated through multiplexor 221 to the MAC counter to return it to the specified address.

The following describes how the seven bits of the OP code received from the memory system 102 are received and stored in register 219. The INSREQ signal is high to indicate that the processor is receiving a memory instruction from the 102 memory system. The memory system generates a memory complete signal when it has completed its function and at this time the IMCOMP signal is made true. This causes gates 1705 and 1703 to generate a true signal which is a load signal into the MRS register. This causes the register to load the information now on the B input of multiplexor 1702. From there, the OP code information in register 219 is gated via multiplexor 221 and into the MAC counter which, in turn, sets the microstore 222 to the required address.

It should be noted that the OP code information received by the MRS counter comprises only seven bits while the MAC counter 220 is a 12-bit counter. The seven bits of the received OP code are placed in bit positions 1 through 7 of register 219. The remaining bits required by counter 220 are hard-wired into the B input of multiplexor 1702 in the following manner. Bit 0 is wired permanently as a zero; bits 8 and 9 are wired permanently as ones; bits 10 and 11 are wired as zeros. This hard-wiring uniquely positions the OP code into a starting table into the microstore system so that each received OP code drives the MAC counter and microstore 222 to the beginning word of the required block of program words.

The MRS counter comprises three Texas Instrument-type integrated circuits SN74298. These integrated circuits are storage-type multiplexors and they include both the MRS counter 219 as well as input multiplexor 1702.

It should be mentioned at this time that the circuitry of FIG. 2 differs from that of FIG. 17 slightly with respect to the manner in which the information on path 210 of FIG. 2 is applied to the MAC counter 220. On FIG. 2, for purposes of simplicity and ease of understanding, path 210 is shown as connected directly to the input of multiplexor 221. On FIG. 17, path 210 is not directly connected to an input of multiplexor 221, but instead, is connected to the B input of multiplexor 1702 and, in turn, to the input of MRS register 219. From there, the signals on path 210 are applied from the output of register 219 to the A input of multiplexor 221 and, in turn, to MAC counter 220. In summary, the FIG. 17 illustrates the preferred circuit details regarding the manner in which path 210 is accessible to the MAC counter 220; FIG. 2 illustrates a simplified version.

FIG. 18 — MICROSTORE 222

Figure 18:
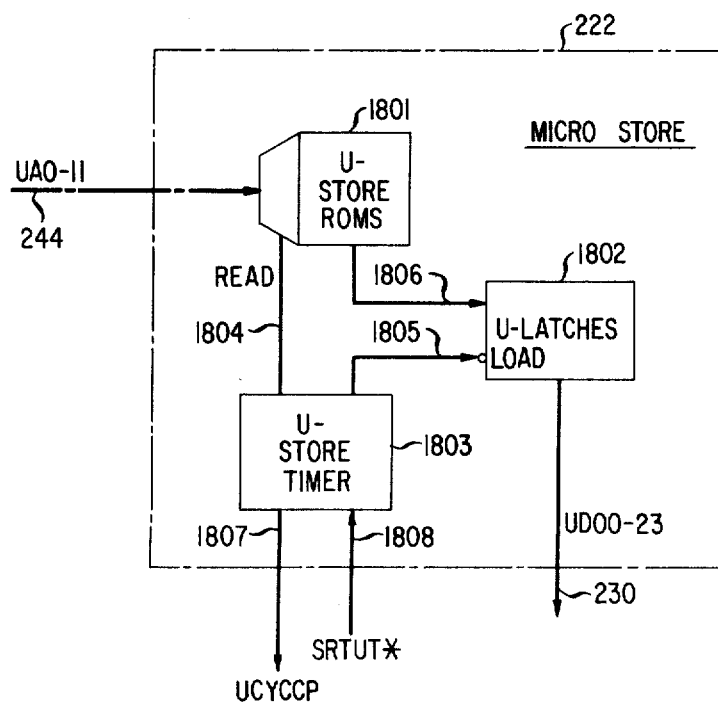
FIG. 18 discloses the details of the microstore 222 of FIG. 2.

FIG. 18 illustrates further details of the circuitry and equipment comprising microstore 222 of FIG. 2. As shown, the microstore comprises the microstore ROMS 1801, microlatches 1802, and microstore timer 1803. The microstore ROMS 1801 actually comprise six Signetics-type 2580 integrated circuits arranged and wired to form a 2048 by 23-bit memory excluding the parity bit. The addressing information for the ROMS is received from MAC counter 220 over path 244. The strobe or read signal is received from the microstore timer 1803 over path 1804. The output of the ROMS is applied over path 1806 to the microlatches 1802.

The sequence of operation is as follows: The timing generator at the start of a microinstruction generates the SRTUT* signal which causes the microstore timer 1803 to start the accessing of the ROMS 1801. Under control of the address information on path 244, the ROMS are read out and the contents of the addressed word are applied over path 1806 and entered into microlatches 1802. This is done under control of a load signal generated by the microstore timer 1803 and extended over path 1805 to the microlatches. The timer returns a UCYCCP signal over path 1807 when it has completed the function of reading out the ROMS and entering the readout contents in the microlatches 1802. The output of the latches is applied over path 230 to the decoding logic 226 which generates the control signals required by the system of FIGS. 2 and 3 to perform the work function associated with the word readout of the microstore 222.

The latches 1802 comprise six Texas Instrument-type integrated circuits SN74298. The microstore timer 1803 comprises a Texas Instrument-type integrated circuit 74161 arranged as a timer; it further comprises one Texas Instruments-type SN7474 arranged as flip-flops and one Texas Instruments-type integrated circuit 7408 arranged as gates.

FIG. 19 — DESTINATION DECODER

Figure 19:
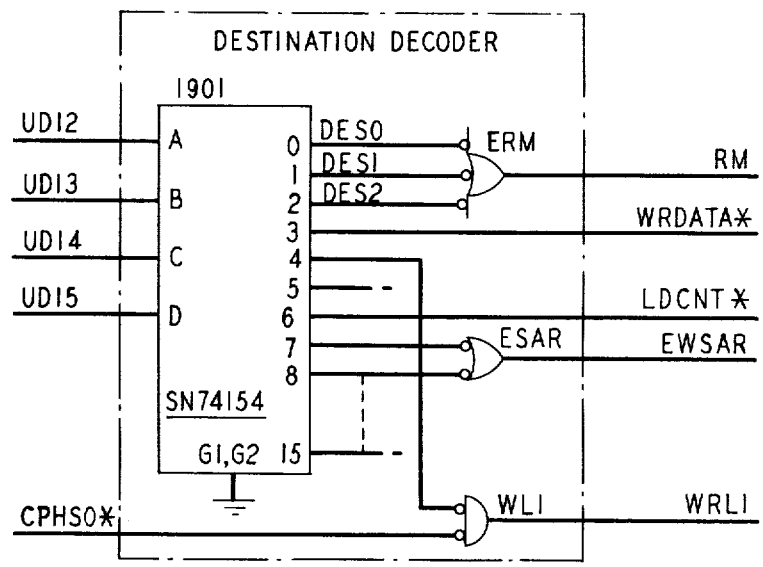
FIG. 19 discloses the details of the destination decoder portion of the decoding logic 226 of FIG. 2.

FIG. 19 illustrates further details of the destination decoder which is a part of the decoding logic 226 in FIG. 2. The destination decoder is used to determine where the information should be stored that is applied to the destination bus 205 by the AMU 202. The destination decoder is connected to four of the UD—conductors that comprise the output of the microstore 222. The decoder is of the 4- to 16-type and it decodes the four bits of the destination field of a microinstruction as shown in FIGS. 25 and 26 to determine the circuit that is to receive the information on the destination bus. Gate ERM receives the outputs of positions 0, 1, and 2 of the decoder and generates an RM signal. The RM signal indicates that the RM memory 208 is to receive the information from the destination bus. Positions 7 and 8 of the decoder are applied through gate ESAR to generate an EWSAR signal. This signal, as shown on FIG. 29, is extended to the SAR register 215 where it causes the information on the destination bus 205 to be entered into the SAR register and in turn to the address bus 111. Gate WL1 combines output 4 of the decoder and the end of the clock in phase zero (the CPHSO*) signal to generate the clock information required to load the L register 216. The upper input of the WL1 gate is connected to output 4 of the destination decoder.

FIG. 20 — CONTROL FIELD DECODER

Figure 20:
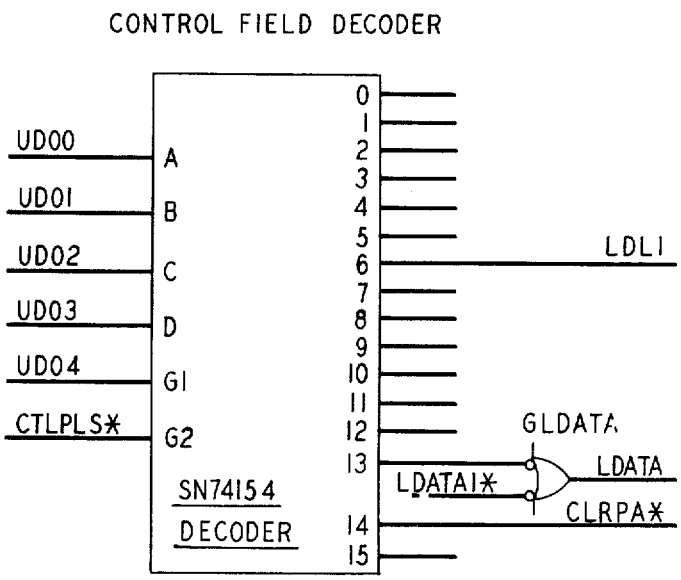
FIG. 20 discloses further details of the decoding logic 222 of FIG. 2.

FIG. 20 illustrates further details of the control field decoder which is also a portion of the decoding logic 226 of FIG. 2. The control field decoder is connected to UD— conductors 0 through 4 of the output of the microstore 222 and it decodes this information to generate the output signals shown on the right side of the decoder. These output terminals are designated 0 through 15. The decoder is of the binary to 1 out of 16 type with each combination of binary input signals applied to the left side resulting in the generation of a signal on a unique output terminal. The G2 input to the decoder is a strobe-type input to control the time at which the received binary information is applied as a 1 out of 16 signal to the decoder output.

FIG. 29

FIG. 29 indicates in tabular form the source circuits for the control signals that are received by the various circuits of the processor. For example, on the top left side of this figure, AMU 202 is shown as receiving two signals from the microstore (MS) 222 and six different signals from the timing generator (TG) 246. The RM memory is shown as receiving signals from the decoding logic (DL) 226, the microstore, and the timing generator. The SC and TPA registers are shown as receiving control signals from the decoding logic, the timing generator, and the AMU. The remainder of FIG. 29 is believed to be self-explanatory so that no further explanation is required.

DESCRIPTION OF TIMING DIAGRAMS FIGS. 4 AND 5

FIGS. 4 and 5 illustrate the time relationship between the various control signals received by the circuitry of FIGS. 17 and 18. Signals 401 and 402 orient the remainder of the signals on FIG. 4 timewise, as well as with respect to the signals on FIG. 28. Signal 401 is the same as the PHASE O signal on FIG. 28 and the PRECLK signal 402 is the same as the PRECLK signal on FIG. 28.

Signal 403 indicates the potential on conductor 1805; a high on this conductor loads the microlatches 1802 with the output of the microstore ROMS 1801.

The STRUT* signal 404 switching from a negative to a positive state when the LDCNT* and the RSMAC* conductors are high, increments the MAC counter 220 one position. As already described, this accesses the next word of the microstore ROMS 1801. The next occurrence of the signal 403 on lead 1805 loads the microlatches 1802 with the newly addressed microstore ROM word.

Signals 405 and 406 pertain to system conditions in which the microprogram encounters a branch condition in which the output of the latches 1802 specify the next microprogram address to which the MAC counter 220 should be advanced. This information is fed back to the MAC counter 220 via input B of multiplexor 221. Therefore, it is necessary that the SUBOP control conductor of the multiplexor be high at this time. With respect to the signal 405, the first negative occurrence of the signal increments the MAC counter 220 one step. The second negative occurrence of the 405 signal (the trailing edge of this signal) loads the MAC counter with the address information currently on path 230 since the conductor LDCNT* is low at this time. The MAC counter in turn accesses the microprogram word to which it was set by this signal.

Signal 407 illustrates the additional control signal required to perform a subroutine call. Signals 405 and 406 are present and perform the same functions as already indicated. However, on a subroutine call it is necessary to save the address information indicating the position to which the MAC counter has been incremented. This is done by the 407 signal which loads the MRS counter 219 with the address information on path 244. This information is applied via the A input of multiplexor 1702 to the MRS register 219.

Signal 408 illustrates the control signal generated at the end of a subroutine call. This signal is appied to lead 1706 and it loads the MAC counter with the current contents of the MRS register 219. This is done under control of the SUBOP control signal applied to the multiplexor 221. This signal is low to activate the A input of the multiplexor and thereby permit the contents of the MRS register to be entered into the MAC counter.

FIG. 5 illustrates the system control signals that control the entering of a program word from the system memory 102 into the MAC counter 220. Signal 501 indicates the end of the phase 3 signal shown on FIG. 28. The CTLPLS* signal is identical to that on FIG. 28 and occurs immediately upon termination of the phase 3 signal. The INSREQ signal 503 going high activates the B input of multiplexor 1702 so that the program instruction word applied to path 210 can be entered via multiplexor 1702 into the MRS register 219. This entry occurs at the time indicated by the arrow above the signal 503. The IMCOMP signal 504 and the IMSREQ signal 503 turn on AND gate 1705 and permit the MRS register to be loaded with the program word information on path 210 via the B input of multiplexor 1702.

The SUBOP signal 505 is low during the entirety of this operation. This holds input A of multiplexor 221 activated. Subsequently, after both signals 506 and 507 are low and the trailing edge of the 506 signal occurs, the MAC counter 220 is loaded with the contents of the MRS register 219.

Signal 508 indicates the time at which the program word accessed by the 506 and 507 signals can effect a readout of the ROMS 1801 and enter the readout information into the microlatches 1802. The microstore ROMS 1801 require a finite time to perform a readout operation after the reception of a read signal on path 1804. Therefore the load signal 508 is delayed approximately 700 nanoseconds in order to accommodate this readout time and to load the microlatches 1802 with the contents of the microstore 1801 location specified by the control signals on path 244.

What is claimed is:

1. In a processor in which data words are received from and transmitted to an I/O system in a parallel bit format with each word comprising a plurality of multi-bit bytes, said processor being arranged to process each received word on a byte-by-byte basis, said processor comprising, an arithmetic unit (AMU), a plurality of source buses connected to inputs of said AMU, a destination bus connected to an output of said AMU, source circuits and destination circuits wherein some of said circuits are able to store a plurality of words, gating means effective on a processor operation for connecting a different selected one of said source circuits to each of said source buses, further gating means effective on said operation for connecting any selected one of said destination circuits to said destination bus, control means effective on said operation for applying a word byte-by-byte from each of said selected source circuits to said AMU via said source buses, means effective on said last named operation whereby one of said applied words received by said AMU is a specified one of a plurality of words in one of said selected source circuits whenever said one source circuit has a plural word storage capacity, said AMU being effective for processing said received words to produce an output word, and means including said control means for extending said output word from said AMU over said destination bus into said selected destination circuit byte-by-byte, said last name means being effective to enter said output word into a specified one of a plurality of word locations of said selected destination circuit whenever said selected destination circuit is a circuit having a plural word storage capacity, each of said word locations comprising a plurality of byte storage locations.

2. The processor of claim 1 wherein said processor further comprises; a data register, a data bus extending from said I/O system and connected to said register, means for selectively connecting said source buses and said destination bus to said register, means in said register for registering a data word received in a parallel bit format from said data bus, means in said register for subsequently applying said registered word byte-by-byte to a selected one of said source buses, means in said register for registering an AMU output word received by said register byte-by-byte from said destination bus, and means in said register for applying said output word to said data bus in a parallel bit format.

3. The processor of claim 1 wherein at least one of said source circuits is also one of said destination circuits, said processor further comprising; means including said control means effective on a single processor operation for causing said one source circuit to first apply a registered word byte-by-byte to said source bus and then to receive and register an AMU output word byte-by-byte from said destination bus.

4. The processor of claim 1 wherein said processor further comprises; means for detecting an all zeros state of a first byte of an output word applied by said AMU to said destination bus, means responsive to said detection for setting an indicator to signify said detected all zeros state, said detecting means being effective to maintain said indicator in said set state as long as each subsequent byte of said processed word contains all zeros, means including said detecting means for resetting said indicator to signify a nonzero state if any subsequent byte of said processed word does not contain all zeros, and means effective upon said resetting for preventing said indicator from being switched to a set state upon the detection of any subsequent byte of said processed word containing all zeros.

5. The processor of claim 1 wherein one of said source circuits comprises an address register, and wherein another one of said source circuits comprises an addressable memory having a plurality of word locations, said processor further comprising; means in said address register for receiving and registering address information bits from said I/O system in a parallel bit format, a first address input on said memory for receiving address information over a path extending directly from said address register to said first input, a second address input on said memory for receiving address information from said destination bus, and control means effective on a processor operation for selectively activating any one of said address inputs for causing said memory to readout and apply to a selected one of said source buses the word specified by the address information applied to said activated input.

6. The processor of claim 5 wherein said address register has a capacity of $m$ bytes where $m$ is less than all of the bytes of a word, said processor further comprising; means for selectively applying the bits in said address register to a selected one of said source buses byte-by-byte during $m$ phases of a processor operation having a phase unique to each byte of a word, and means for isolating said selected source bus signalwise from said address register after the reception of $m$ bytes by said selected source bus from said address register.

7. The processor of claim 1 wherein one of said source circuits comprises a read-only memory (ROM) for storing in a byte-by-byte format a plurality of words each of which represents a different constant, said processor further comprising; means for detecting the occurrence of a processing operation requiring the reception by said AMU of a selected one of said constants stored in said ROM, and means responsive to said detection for applying said selected constant from said ROM over one of said source buses to said AMU.

8. In a processor in which data words are received from and transmitted to an I/O system in a parallel bit format with each word comprising a plurality of multi-bit bytes, said processor being arranged to process each received word on a byte-by-byte basis, said processor comprising, an arithmetic unit (AMU), a plurality of source buses connected to inputs of said AMU, a destination bus connected to an output of said AMU, the conductors of each of said buses being equal in number to the number of bits in a byte, source memories and destination memories each of which has a plurality of byte storage locations with each location of each memory being identified by a unique address, addressing means for controllably applying byte address information to any selected one of said memories, source registers and destination registers with some of said registers being able to store at least one word, gating means effective on a processor operation for connecting different selected ones of said source memories or said source registers to each of said source buses and for connecting any selected one of said destination memories or said destination registers to said destination bus, means effective upon each processor operation for selecting different ones of said source memories or said source registers as source circuits, means further effective upon each operation for selecting any one of said destination memories or said destination registers as a destination circuit, means effective on a processor operation for applying a word byte-by-byte from each of said selected source circuits to said AMU via said source buses, said last named means including said addressing means and said gating means whenever one of said memories is selected as one of said source circuits, control means effective for specifying the AMU function to be performed upon the reception of each word by said AMU from said source buses, means in said AMU responsive to each reception for performing said specified operation on each received word to produce an AMU output word, and means effective for extending said output word from said AMU over said destination bus into said selected destination circuit byte-by-byte.

9. The processor of claim 8 wherein said control means comprises, a micromemory having a plurality of microword locations with each microword having bits for specifying the function to be performed by said AMU on an operation as well as the source and destination circuits that are to be connected to said source and destination buses on each operation, means for receiving instruction words from said I/O system with each instruction word containing bit information identifying a microword location in said micromemory, and means responsive to the reception of each instruction word for reading out from said micromemory the microword identified by said received instruction word, said control means being responsive to said micromemory readout to control the function performed by said AMU.

10. The processor of claim 9 wherein said processor further comprises; a data register, a data bus extending from said I/O system and connected to said register, means for selectively connecting said source buses and said destination bus to said data register, means in said data register for registering a data word received in a parallel bit format from said data bus, means in said data register for subsequently applying said registered word byte-by-byte to a selected one of said source buses, means in said register for subsequently registering an AMU output word received byte-by-byte from said destination bus, and means in said register for applying said output word to said data bus in a parallel bit format.

11. The processor of claim 10 wherein one of said source circuits is also said destination circuit, said processor further comprising; means including said control means and said addressing means effective on a single processor operation for causing said one source circuit to first apply a stored word byte-by-byte to a selected one of said source buses and then to receive and store an AMU output word byte-by-byte from said destination bus.

12. The processor of claim 10 wherein said processor further comprises; means for detecting an all zeros state of a first byte of a processed output word applied by said AMU to said destination bus, means responsive to said detection for setting an indicator to signify said detected all zeros state, said detecting means being effective to maintain said indicator in said set state as long as each subsequent byte of said processed word contains all zeros, means including said detecting means for resetting said indicator to signify a nonzero state if any subsequent byte of said processed word does not contain all zeros, and means effective upon said resetting for preventing said indicator from being switched to a set state upon the detection of any subsequent byte of said processed word containing all zeros.

13. The processor of claim 10 wherein one of said source registers comprises an address register, said processor further comprising; means in said address register for receiving and registering address information bits from said I/O system in a parallel bit format, a first address input on one of said source memories for receiving address information over a path extending directly from said address register to said first address input, a second address input on said memory for receiving address information from said destination bus, and control means effective on a processor operation for selectively activating any one of said address inputs for causing said memory to read out and apply to one of said source buses the word specified by the address information applied to said activated input.

14. The processor of claim 13 wherein said address register has a capacity of $m$ bytes where $m$ is less than all of the bytes of a word, said processor further comprising; means for selectively applying the bits in said address register to a selected one of said source buses byte-by-byte during $m$ phases of a processor operation having a phase unique to each byte of a word, and means for isolating said selected source bus signalwise from said address register after the reception of $m$ bytes by said selected source bus from said address register.

15. The processor of claim 10 wherein one of said source memories comprises a read-only memory (ROM) for storing in a byte-by-byte format a plurality of words each of which represents a different constant, said processor further comprising; means for detecting the occurrence of a processing operation requiring the reception by said AMU of a selected one of said constants stored in said ROM, and means responsive to said detection for applying said selected constant from said ROM over one of said source buses to said AMU.

16. In a processor in which data words are received from and transmitted to an I/O system in a parallel bit format with each word comprising a plurality of multi-bit bytes, said processor being arranged to process each received word on a byte-by-byte basis, said processor comprising; an arithmetic unit (AMU), a source bus connected to an input of said AMU, a destination bus connected to an output of said AMU, source circuits and destination circuits with some of said circuits being able to store at least one word, gating means effective on each processor operation for connecting any selected one of said source circuits to said source bus and for connecting any selected one of said destination circuits to said destination bus, means effective upon each operation for applying a word byte-by-byte from said selected source circuit to said AMU via said source bus, said AMU being effective for processing said received word, means effective upon each operation for extending said processed word as an output word from said AMU over said destination bus into said selected destination circuit byte-by-byte, means for detecting an all zeros state of a first byte of a processed output word applied by said AMU to said destination bus, means responsive to said detection for setting an indicator to signify said detected all zeros state, said detecting means being effective to maintain said indicator in said set state as long as each subsequent byte of said processed word contains all zeros, means including said detecting means for resetting said indicator to signify a nonzero state if any subsequent byte of said processed word does not contain all zeros, and means effective upon said resetting for preventing said indicator from being switched to a set state upon the detection of any subsequent byte of said processed word containing all zeros.

17. In a processor in which data words are received from and transmitted to an I/O system in a parallel bit format with each word comprising a plurality of multi-bit bytes, said processor being arranged to process each received word on a byte-by-byte basis, said processor comprising; an arithmetic unit (AMU), a source bus connected to an input of said AMU, a destination bus connected to an output of said AMU, source circuits and destination circuits with some of said circuits being able to store at least one word, gating means effective on each processor operation for connecting any selected one of said source circuits to said source bus and for connecting any selected one of said destination circuits to said destination bus, means effective upon each operation for applying a word byte-by-byte from said selected source circuit to said AMU via said source bus, said AMU being effective for processing said received word, means effective upon each operation for extending said processed word as an output word from said AMU over said destination bus into said selected destination circuit byte-by-byte, said source circuits including an address register and further including an addressable memory having a plurality of word locations, said processor further comprising; means in said address register for receiving and registering address information bits from said I/O system in a parallel bit format, a first address input on said memory for receiving address information over a path extending directly from said address register to said first address input, a second address input on said memory for receiving address information from said destination bus, and control means effective on a processor operation for selectively activating any one of said address inputs of said memory for causing said memory to read out and apply to said source bus the word specified by the information on said activated address input.

18. The processor of claim 17 wherein said address register has a capacity of $m$ bytes where $m$ is less than all of the bytes of a word, said processor further comprising; means for selectively applying the bits in said address register to said source bus byte-by-byte during $m$ phases of a processor operation having a phase unique to each byte of a word, and means for isolating said source bus signalwise from said address register after the reception of $m$ bytes by said source bus from said address register.

19. In a processor in which data words are received from and transmitted to an I/O system in a parallel bit format with each word comprising a plurality of multi-bit bytes, said processor being arranged to process each received word on a byte-by-byte basis, said processor comprising; an arithmetic unit (AMU), a source bus connected to an input of said AMU, a destination bus connected to an output of said AMU, source circuits and destination circuits with some of said circuits being able to store at least one word gating means effective on each processor operation for connecting any selected one of said source circuits to said source bus and for connecting any selected one of said destination circuits to said destination bus, means effective upon each operation for applying a word byte-by-byte from said selected source circuit to said AMU via said source bus, said AMU being effective for processing said received word, means effective upon each operation for extending said processed word as an output word from said AMU over said destination bus into said selected destination circuit byte-by-byte, said source circuits including a read-only memory (ROM) for storing in a byte-by-byte format a plurality of words each of which represents a different constant, said processor further comprising; means for detecting the occurrence of a processor operation requiring the reception by said AMU of a selected one of said constants stored in said ROM, and means responsive to said detection for applying said selected constant byte-by-byte from said ROM over one of said source buses to said AMU.

20. In a processor in which data words are received from and transmitted to an I/O system in a parallel bit format with each word comprising a plurality of multibit bytes, said processor being arranged to process each received word on a byte-by-byte basis, said processor comprising; an arithmetic unit (AMU), a source bus connected to an input of said AMU, a destination bus connected to an output of said AMU, source information storage elements and destination information storage elements with some of said elements being able to store at least one word, gating means effective on each processor operation for connecting any selected one of said source elements to said source bus and for connecting any selected one of said destination elements to said destination bus, means for applying a word byte-by-byte from said selected source element to said AMU via said source bus, control means for specifying the AMU function to be performed upon the reception of each word by said AMU from said source bus, means in said AMU responsive to each reception of a word for performing on said word the operation specified by said control means to produce an AMU output word, means for extending said output word from said AMU over said destination bus into said selected destination element byte-by-byte, said control means comprising; a micromemory having a plurality of word locations with each word having bits for specifying the function to be performed by said AMU on an operation as well as the source and destination elements that are to be connected to said source and destination buses on each operation, means for receiving instruction words from said I/O system with each instruction word containing bit information identifying a word location in said micromemory, and means responsive to the reception of each instruction word for reading out from said micromemory the micromemory word identified by said received instruction word, said control means being responsive to said micromemory readout ot control the function performed by said AMU.

* * * * *